(12) United States Patent
Numazawa et al.

(10) Patent No.: US 12,331,207 B2
(45) Date of Patent: Jun. 17, 2025

(54) INK JET RECORDING INK AND INK JET RECORDING METHOD

(71) Applicant: FUJIFILM Corporation, Tokyo (JP)

(72) Inventors: Hiromichi Numazawa, Kanagawa (JP); Daisuke Sasaki, Kanagawa (JP); Yusuke Sakai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 169 days.

(21) Appl. No.: 18/167,880

(22) Filed: Feb. 12, 2023

(65) Prior Publication Data

US 2023/0203330 A1 Jun. 29, 2023

Related U.S. Application Data

(63) Continuation of application No. PCT/JP2021/025956, filed on Jul. 9, 2021.

(30) Foreign Application Priority Data

Sep. 11, 2020 (JP) .................. 2020-153118

(51) Int. Cl.
*C09D 11/328* (2014.01)
*B41J 2/01* (2006.01)
(Continued)

(52) U.S. Cl.
CPC .............. *C09D 11/328* (2013.01); *B41J 2/01* (2013.01); *B41J 2/2107* (2013.01);
(Continued)

(58) Field of Classification Search
CPC ......... C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563;
(Continued)

(56) References Cited

U.S. PATENT DOCUMENTS

2008/0076043 A1* 3/2008 Mori .................. G03F 7/031
522/74
2009/0085017 A1* 4/2009 Nemoto ............ G03F 7/0007
252/586
(Continued)

FOREIGN PATENT DOCUMENTS

CN 107924007 4/2018
EP 3950856 2/2022
(Continued)

OTHER PUBLICATIONS

"Search Report of Europe Counterpart Application", issued on Feb. 12, 2024, pp. 1-7.
"International Search Report (Form PCT/ISA/210) of PCT/JP2021/025956", mailed on Sep. 21, 2021, with English translation thereof, pp. 1-6.
"Written Opinion of the International Searching Authority (Form PCT/ISA/237) of PCT/JP2021/025956", mailed on Sep. 21, 2021, with English translation thereof, pp. 1-6.
(Continued)

*Primary Examiner* — Manish S Shah
(74) *Attorney, Agent, or Firm* — JCIPRNET

(57) ABSTRACT

Provided is an ink jet recording ink containing a near-infrared absorbing colorant represented by Formula 1, a polymerizable monomer, a polymerization initiator, and a dispersant, in which a content of the polymerizable monomer is 50% by mass or more with respect to a total amount of the ink jet recording ink, and a difference between an SP value of the polymerizable monomer and an SP value of the dispersant is 3.8 MPa$^{1/2}$ to 16.0 MPa$^{1/2}$. Also provided is an ink jet recording method.

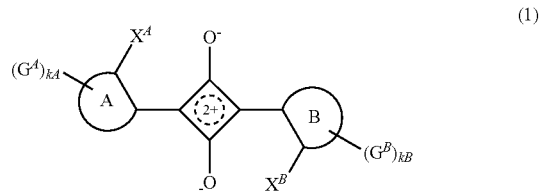

The description of a ring A, a ring B, $X^A$, $X^B$, $G^A$, $G^B$, kA, and kB in Formula 1 will not be repeated.

10 Claims, No Drawings

(51) Int. Cl.
  *B41J 2/21* (2006.01)
  *B41J 11/00* (2006.01)
  *C09B 57/00* (2006.01)
  *C09D 11/037* (2014.01)
  *C09D 11/101* (2014.01)
  *C09D 11/107* (2014.01)
  *C09D 11/322* (2014.01)
  *C09D 11/326* (2014.01)
  *C09D 11/38* (2014.01)

(52) U.S. Cl.
  CPC ......... *B41J 11/0021* (2021.01); *C09B 57/007* (2013.01); *C09D 11/037* (2013.01); *C09D 11/101* (2013.01); *C09D 11/107* (2013.01); *C09D 11/322* (2013.01); *C09D 11/326* (2013.01); *C09D 11/38* (2013.01)

(58) Field of Classification Search
  CPC .............. B41M 5/0011; B41M 5/0017; B41M 5/0023; B41M 5/0047; B41M 7/00; B41M 7/0072; B41M 5/52; B41M 5/5218; B41M 5/5227
  See application file for complete search history.

(56) References Cited

U.S. PATENT DOCUMENTS

| | | |
|---|---|---|
| 2009/0189128 A1 | 7/2009 | Takiguchi et al. |
| 2010/0108949 A1* | 5/2010 | Hirokawa ............ C07D 239/70 544/231 |
| 2012/0235099 A1* | 9/2012 | Ushijima .............. C09B 69/108 430/7 |
| 2013/0137018 A1 | 5/2013 | Arayama et al. |
| 2014/0061505 A1* | 3/2014 | Steppel ................ C09D 11/037 250/200 |
| 2015/0056549 A1 | 2/2015 | Ikeda et al. |
| 2018/0163022 A1* | 6/2018 | Hirai .................... C07D 235/20 |
| 2018/0259849 A1* | 9/2018 | Hirai ................. H01L 27/14623 |
| 2019/0018174 A1 | 1/2019 | Ito et al. |
| 2020/0115556 A1 | 4/2020 | Sakamoto et al. |
| 2022/0403194 A1* | 12/2022 | Numazawa ................ B41J 2/01 |
| 2023/0142929 A1 | 5/2023 | Makuta et al. |

FOREIGN PATENT DOCUMENTS

| | | |
|---|---|---|
| EP | 4183845 | 5/2023 |
| JP | 2007131789 | 5/2007 |
| JP | 2009180768 | 8/2009 |
| JP | 2010106153 | 5/2010 |
| JP | 2012041485 | 3/2012 |
| JP | 2013129746 | 7/2013 |
| JP | 2018053129 | 4/2018 |
| JP | 2018154672 | 10/2018 |
| JP | 2018193477 | 12/2018 |
| JP | 2019001983 | 1/2019 |
| JP | 2019099733 | 6/2019 |
| WO | 2021199997 | 10/2021 |
| WO | 2022014236 | 1/2022 |

OTHER PUBLICATIONS

"Office Action of China Counterpart Application", with English translation thereof, issued on Mar. 28, 2025, pp. 1-17.

* cited by examiner

INK JET RECORDING INK AND INK JET RECORDING METHOD

CROSS-REFERENCE TO RELATED APPLICATION

This application is a Continuation of International Application No. PCT/JP2021/025956, filed Jul. 9, 2021, which claims priority to Japanese Patent Application No. 2020-153118 filed Sep. 11, 2020. Each of the above applications is hereby expressly incorporated by reference, in its entirety, into the present application.

BACKGROUND OF THE INVENTION

1. Field of the Invention

The present disclosure relates to an ink jet recording ink and an ink jet recording method.

2. Description of the Related Art

Having invisibility, a near-infrared absorbing colorant that absorbs an infrared ray but substantially does not absorb visible light is expected to be applied in the field of ink.

For example, JP2019-001983A describes an ink jet ink containing a squarylium dye, a dispersant, an organic solvent, and water.

Furthermore, a method is known in which a polymerizable compound is incorporated into an ink and cured with an active energy ray to record an image.

SUMMARY OF THE INVENTION

However, in a case where the squarylium dye was dispersed with a dispersant as in JP2019-001983A, the readability was insufficient.

The present disclosure has been made in view of such circumstances, and according to an embodiment of the present invention, there is provided an ink jet recording ink and an ink jet recording method which make it possible to obtain an article with a recorded image having excellent readability and having excellent readability after the passage of time.

The present disclosure includes the following aspects.

<1> An ink jet recording ink containing a near-infrared absorbing colorant represented by Formula 1, a polymerizable monomer, a polymerization initiator, and a dispersant, in which a content of the polymerizable monomer is 50% by mass or more with respect to a total amount of the ink jet recording ink, and a difference between an SP value of the polymerizable monomers and an SP value of the dispersant is 3.8 MPa$^{1/2}$ to 16.0 MPa$^{1/2}$.

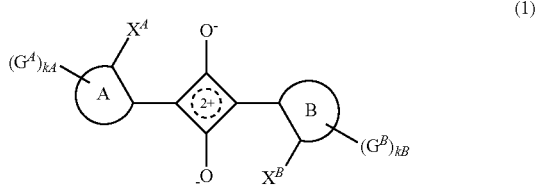

(1)

In Formula 1, a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents an integer which is a maximum number of $G^A$'s capable of substituting for the ring A, $n_B$ represent an integer which is a maximum number of $G^B$'s capable of substituting for the ring B, $X^A$ and $G^A$ may be bonded to each other to form a ring, $X^B$ and $G^B$ may be bonded to each other to form a ring, $G^A$'s may be bonded to each other to form a ring structure in a case where there is a plurality of $G^A$'s, and $G^B$'s may be bonded to each other to form a ring structure in a case where there is a plurality of $G^B$'s.

<2> The ink jet recording ink described in <1>, in which a weight-average molecular weight of the dispersant is 50,000 or less.

<3> The ink jet recording ink described in <1> or <2>, in which the dispersant is a block polymer.

<4> The ink jet recording ink described in any one of <1> to <3>, further comprising a pigment derivative.

<5> The ink jet recording ink described in any one of <1> to <4>, further comprising a siloxane compound.

<6> The ink jet recording ink described in <5>, in which the siloxane compound includes a siloxane compound having a polymerizable group.

<7> The ink jet recording ink described in <6>, in which a content of the siloxane compound having a polymerizable group is 0.5% by mass to 3% by mass with respect to a total amount of the ink jet recording ink.

<8> The ink jet recording ink described in any one of <1> to <7>, in which the polymerization initiator comprises an acylphosphine oxide compound and a thioxanthone compound.

<9> The ink jet recording ink described in any one of <1> to <8>, in which 90% by mass or more of the polymerizable monomer is a polymerizable monomer having a glass transition temperature of 30° C. or higher.

<10> An ink jet recording method using the ink jet recording ink described in any one of <1> to <9>, the ink jet recording method including applying the ink jet recording ink onto a substrate, and irradiating, with an active energy ray the ink jet recording ink applied onto the substrate.

According to the present disclosure, there is provided an ink jet recording ink and an ink jet recording method which make it possible to obtain an article with a recorded image having excellent readability and having excellent readability after the passage of time.

DESCRIPTION OF THE PREFERRED EMBODIMENTS

Hereinafter, the ink jet recording ink and the ink jet recording method of the present disclosure will be specifically described.

In the present specification, a range of numerical values described using "to" means a range including numerical values described before and after "to" as a minimum value and a maximum value, respectively.

Regarding the ranges of numerical values described stepwise in the present specification, the upper limit or the lower limit described in a certain range of numerical values may be replaced with the upper limit or the lower limit of another range of numerical values described stepwise. In addition, in the ranges of numerical values described in the present specification, the upper limit or the lower limit described in a certain numerical range may be replaced with the value shown in Examples.

In the present specification, in a case where there is a plurality of substances in a composition that corresponds to each component of the composition, unless otherwise specified, the amount of each component of the composition means the total amount of the plurality of substances present in the composition.

In the present specification, a combination of two or more preferred embodiments is a more preferred embodiment.

In the present specification, the term "step" includes not only an independent step but also a step which is not clearly distinguished from another step as long as the intended purpose of the step is achieved.

In the present specification, "(meth)acrylate" has a concept that includes both the acrylate and methacrylate. "(Meth)acryl" is a concept that includes both the acryl and methacryl.

In the present specification, "readability after the passage of time" means the readability of an article with a recorded image obtained using an ink left for a predetermined time (for example, one week) after prepared.

[Ink Jet Recording Ink]

The ink jet recording ink of the present disclosure (hereinafter, simply called "ink") contains a near-infrared absorbing colorant represented by Formula 1, polymerizable monomers, a polymerization initiator, and a dispersant, in which a content of the polymerizable monomers is 50% by mass or more with respect to a total amount of the ink jet recording ink, and a difference between an SP value of the polymerizable monomers and an SP value of the dispersant is 3.8 MPa$^{1/2}$ to 16.0 MPa$^{1/2}$.

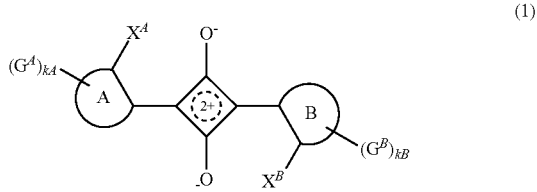

(1)

In Formula 1, a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to $n_A$, kB represents an integer of 0 to $n_B$, $n_A$ represents an integer which is a maximum number of $G^A$'s capable of substituting for the ring A, $n_B$ represent an integer which is a maximum number of $G^B$'s capable of substituting for the ring B, $X^A$ and $G^A$ may be bonded to each other to form a ring, $X^B$ and $G^B$ may be bonded to each other to form a ring, $G^A$'s may be bonded to each other to form a ring structure in a case where there is a plurality of $G^A$'s, and $G^B$'s may be bonded to each other to form a ring structure in a case where there is a plurality of $G^B$'s.

As an ink containing a squarylium dye, for example, JP2019-001983A describes an ink jet ink containing a squarylium dye, a dispersant, an organic solvent, and water.

Meanwhile, a method is known in which a polymerizable monomer is incorporated into an ink and cured with an active energy ray to record an image.

In a case where a squarylium dye and a polymerizable monomer were simply combined to prepare an ink, readability and readability after the passage of time were insufficient. As a result of intensive studies, the inventors of the present invention have found that in a case where an ink jet recording ink is used which contains a near-infrared absorbing colorant represented by Formula 1, polymerizable monomers, a polymerization initiator, and a dispersant and in which a content of the polymerizable monomers is 50% by mass or more with respect to a total amount of the ink jet recording ink, and a difference between an SP value of the polymerizable monomers and an SP value of the dispersant is 3.8 MPa$^{1/2}$ to 16.0 MPa$^{1/2}$, an article with a recorded image having excellent readability and having excellent readability after the passage of time is obtained. Presumably, the article with a recorded image having excellent readability and having excellent readability after the passage of time may be obtained by the ink according to the present disclosure for the following reason.

The ink according to the present disclosure includes a near-infrared absorbing colorant represented by Formula 1 and a dispersant. The dispersant is adsorbed onto the surface of the near-infrared absorbing colorant represented by Formula 1, which makes the near-infrared absorbing colorant represented by Formula 1 dispersed in the ink. Because the surface of the near-infrared absorbing colorant represented by Formula 1 is substantially neutral, it is difficult for the dispersant to be adsorbed onto the surface. The inventors of the present invention have found that the compatibility between the dispersant and a dispersion medium contributes to the readability of the obtained article with a recorded image. In the ink of the present disclosure, the content of the polymerizable monomers is 50% by mass or more with respect to the total amount of the ink jet recording ink. Therefore, the inventors of the present invention paid attention to a difference between an SP value of the polymerizable monomers, which occupy most of the ink according to the present disclosure as a dispersion medium, and an SP value of the dispersant. Presumably, in a case where the difference in Sp value is 3.8 MPa$^{1/2}$ or more, the dispersant is unlikely to be detached from the surface of the near-infrared absorbing colorant represented by Formula 1, and the readability of the obtained article with a recorded image may be improved. On the other hand, presumably, in a case where the difference in SP values is 16.0 MPa$^{1/2}$ or less, the dispersant adsorbed onto the surface of the near-infrared absorbing colorant represented by Formula 1 may spread appropriately, which may make it difficult for the near-infrared absorbing colorants represented by Formula 1 to be aggregated with each other. It is considered that as a result, the readability of the obtained article with a recorded image may be improved. In addition, in the ink according to the present disclosure, the near-infrared absorbing colorant represented by Formula 1 can be stably dispersed for a long period of time by the dispersant, which makes it possible to obtain an article with a recorded image having excellent readability after the passage of time.

Next, each component contained in the ink according to the present disclosure will be described.

(Near-Infrared Absorbing Colorant)

The ink according to the present disclosure includes a near-infrared absorbing colorant represented by Formula 1. The ink may contain one near-infrared absorbing colorant represented by Formula 1 or two or more near-infrared absorbing colorants represented by Formula 1.

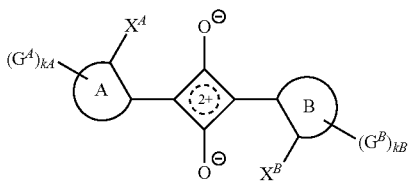
(1)

In Formula 1, a ring A and a ring B each independently represent an aromatic ring or a heteroaromatic ring, $X^A$ and $X^B$ each independently represent a monovalent substituent, $G^A$ and $G^B$ each independently represent a monovalent substituent, kA represents an integer of 0 to nA, and kB represents an integer of 0 to nB. nA represents an integer which is a maximum number of $G^A$'s capable of substituting the ring A, nB represents an integer which is a maximum number of $G^B$'s capable of substituting the ring B. $X^A$ and $G^A$ or $X^B$ and $G^B$ may be bonded to each other to form a ring, and in a case where there is a plurality of $G^A$'s and a plurality of $G^B$'s, the plurality of $G^A$'s bonded to the ring A may be bonded to each other to form a ring structure and the plurality of $G^B$'s bonded to the ring B may be bonded to each other to form a ring structure.

[$G^A$ and $G^B$]

$G^A$ and $G^B$ each independently represent a monovalent substituent.

Examples of the monovalent substituent include a halogen atom, a cyano group, a nitro group, an alkyl group, an alkenyl group, an alkynyl group, an aryl group, a heteroaryl group, an aralkyl group, —$OR^{10}$, —$COR^{11}$, —$COOR^{12}$, —$OCOR^{13}$, —$NR^{14}R^{15}$, —$NHCOR^{16}$, —$CONR^{17}R^{18}$, —$NHCONR^{19}R^{20}$, —$NHCOOR^{21}$, —$SR^{22}$, —$SO_2R^{23}$, —$SO_2OR^{24}$, —$NHSO_2R^{25}$, and $SO_2NR^{26}R^{27}$.

$R^{10}$ to $R^{27}$ each independently represent a hydrogen atom, an aliphatic group, an aromatic group, or a heterocyclic group.

In a case where $R^{12}$ of —$COOR^{12}$ is a hydrogen atom (that is, a carboxy group), the hydrogen atom may be dissociated (that is, a carbonate group) or —$COOR^{12}$ may be in a state of salt. In a case where $R^{24}$ of —$SO_2OR^{24}$ is a hydrogen atom (that is, a sulfo group), the hydrogen atom may be dissociated (that is, a sulfonate group) or —$SO_2OR^{24}$ may be in a state of salt.

Examples of the halogen atom include a fluorine atom, a chlorine atom, a bromine atom, and an iodine atom.

The number of carbon atoms in the alkyl group is preferably 1 to 20, more preferably 1 to 15, and even more preferably 1 to 8. The alkyl group may be linear, branched, or cyclic, and is preferably linear or branched.

The number of carbon atoms in the alkenyl group is preferably 2 to 20, more preferably 2 to 12, and particularly preferably 2 to 8. The alkenyl group may be linear, branched, or cyclic, and is preferably linear or branched.

The number of carbon atoms in the alkynyl group is preferably 2 to 40, more preferably 2 to 30, and particularly preferably 2 to 25. The alkynyl group may be linear, branched, or cyclic, and is preferably linear or branched.

The number of carbon atoms in the aryl group is preferably 6 to 30, more preferably 6 to 20, and even more preferably 6 to 12.

The alkyl moiety of the aralkyl group is the same as the aforementioned alkyl group. The aryl moiety of the aralkyl group is the same as the aforementioned aryl group. The number of carbon atoms in the aralkyl group is preferably 7 to 40, more preferably 7 to 30, and even more preferably 7 to 25.

The heteroaryl group is preferably a monocyclic ring or a fused ring, more preferably a monocyclic ring or a fused ring composed of 2 to 8 rings fused together, and even more preferably a monocyclic ring or a fused ring composed of 2 to 4 rings fused together. The number of heteroatoms configuring the ring of the heteroaryl group is preferably 1 to 3. The heteroatom configuring the ring of the heteroaryl group is preferably a nitrogen atom, an oxygen atom, or a sulfur atom. The heteroaryl group is preferably a 5-membered ring or a 6-membered ring. The number of carbon atoms configuring the ring of the heteroaryl group is preferably 3 to 30, more preferably 3 to 18, and even more preferably 3 to 12. Examples of the heteroaryl group include a pyridine ring, a piperidine ring, a furan ring, a furfuran ring, a thiophene ring, a pyrrole ring, a quinoline ring, a morpholine ring, an indole ring, an imidazole ring, a pyrazole ring, a carbazole ring, a phenothiazine ring, a phenoxazine ring, an indoline ring, a thiazole ring, a pyrazine ring, a thiadiazine ring, a benzoquinoline ring, and a thiadiazole ring.

The alkyl group, the alkenyl group, the alkynyl group, the aralkyl group, the aryl group, and the heteroaryl group may have a substituent or may be unsubstituted.

Examples of the substituent include the substituents described in paragraph "0030" of JP2018-154672A. Examples of the substituent include an alkyl group, an aryl group, an amino group, an alkoxy group, an aryloxy group, an aromatic heterocyclic oxy group, an acyl group, an alkoxycarbonyl group, an aryloxycarbonyl group, an acyloxy group, an acylamino group, an alkoxycarbonylamino group, an aryloxycarbonylamino group, a sulfonylamino group, an alkylthio group, an arylthio group, an aromatic heterocyclic thio group, a sulfonyl group, a hydroxy group, a mercapto group, a halogen atom, a cyano group, a sulfo group, and a carboxy group. As the substituent, among these, an alkyl group, an aryl group, an alkoxy group, an aryloxy group, an aromatic heterocyclic oxy group, an acyl group, an alkoxycarbonyl group, an aryloxycarbonyl group, an acyloxy group, an alkylthio group, an arylthio group, an aromatic heterocyclic thio group, a sulfonyl group, a hydroxy group, a mercapto group, a halogen atom, a cyano group, a sulfo group, or a carboxy group is preferable.

"Number of carbon atoms" in a substituent means "total number of carbon atoms" in the substituent. For details of each substituent, the substituents described in paragraphs "0031" to "0035" of JP2018-154672A can be referred to.

[$X^A$ and $X^B$]

$X^A$ and $X^B$ each independently represent a monovalent substituent.

The substituent represented by $X^A$ and $X^B$ is preferably a group having active hydrogen, more preferably —OH, —SH, —COOH, —$SO_3H$, —$NR^{X1}R^{X2}$, —$NHCOR^{X1}$, —$CONR^{X1}R^{X2}$, —$NHCONR^{X1}R^{X2}$, —$NHCOOR^{X1}$, —$NHSO_2R^{X1}$, —$B(OH)_2$, or $PO(OH)_2$, and even more preferably —OH, —SH, or $NR^{X1}R^{X2}$.

$R^{X1}$ and $R^{X2}$ each independently represent a hydrogen atom or a monovalent substituent. Examples of the substituent include an alkyl group, an alkenyl group, an alkynyl group, an aryl group, and a heteroaryl group. Among these, an alkyl group is preferable as the substituent. The alkyl group is preferably linear or branched. Details of the alkyl group, the alkenyl group, the alkynyl group, the aryl group, and the heteroaryl group are the same as the ranges described above regarding $G^A$ and $G^B$.

[Ring A and Ring B]

The ring A and the ring B each independently represent an aromatic ring or a heteroaromatic ring.

The aromatic ring and the heteroaromatic ring may be a monocyclic ring or a fused ring.

Examples of the aromatic ring and the heteroaromatic ring include a benzene ring, a naphthalene ring, a pentalene ring, an indene ring, an azulene ring, a heptalene ring, an indecene ring, a perylene ring, a pentacene ring, an acenaphthalene ring, a phenanthrene ring, an anthracene ring, a naphthacene ring, a chrysene ring, a triphenylene ring, a fluorene ring, a biphenyl ring, a pyrrole ring, a furan ring, a thiophene ring, an imidazole ring, an oxazole ring, a thiazole ring, a pyridine ring, a pyrazine ring, a pyrimidine ring, a pyridazine ring, an indolidine ring, an indole ring, a benzofuran ring, a benzothiophene ring, an isobenzofuran ring, a quinolizine ring, a quinoline ring, a phthalazine ring, a naphthyridine ring, a quinoxaline ring, a quinoxazoline ring, an isoquinoline ring, a carbazole ring, a phenanthridine ring, an acridine ring, a phenanthroline ring, a thianthrene ring, a chromene ring, a xanthene ring, a phenoxathiin ring, a phenothiazine ring, and a phenazine ring.

As the ring A and the ring B, among the above, an aromatic ring is preferable, and a benzene ring or a naphthalene ring is more preferable.

The aromatic ring may be unsubstituted or may have a substituent. Examples of the substituent include the substituents described above regarding $G^A$ and $G^B$.

$X^A$ and $G^A$ or $X^B$ and $G^B$ may be bonded to each other to form a ring. In a case where there is a plurality of $G^A$'s and a plurality of $G^B$'s, $G^A$'s may be bonded to each other to form a ring, and $G^B$'s may be bonded to each other to form a ring. The ring is preferably a 5-membered ring or a 6-membered ring. The ring may be a monocyclic ring or a heterocyclic ring.

In a case where $X^A$ and $G^A$, $X^B$ and $G^B$, $G^A$'s, or $G^B$'s are bonded to each other to form a ring, these may be directly bonded to each other to form a ring or bonded to each other via a divalent linking group selected from the group consisting of an alkylene group, —CO—, —O—, —NH—, —BR—, and a combination of these to form a ring. It is preferable that $X^A$ and $G^A$, $X^B$ and $G^B$, $G^A$'s, or $G^B$'s be bonded to each other via —BR— to form a ring.

R represents a hydrogen atom or a monovalent substituent. Examples of the substituent include the substituents described above regarding $G^A$ and $G^B$. As the substituent, an alkyl group or an aryl group is preferable.

[kA and kB]

kA represents an integer of 0 to nA, kB represents an integer of 0 to nB, nA represents an integer which is the maximum number of substituents capable of substituting the ring A, and nB represents an integer which is the maximum number of substituents capable of substituting the ring B.

kA and kB preferably each independently represent 0 to 4, more preferably each independently represent 0 to 2, and particularly preferably each independently represent 0 or 1. It is preferable that a case where kA and kB simultaneously represent 0 (zero) be ruled out.

From the viewpoint of light resistance, the near-infrared absorbing colorant represented by Formula 1 is preferably a compound represented by Formula 2.

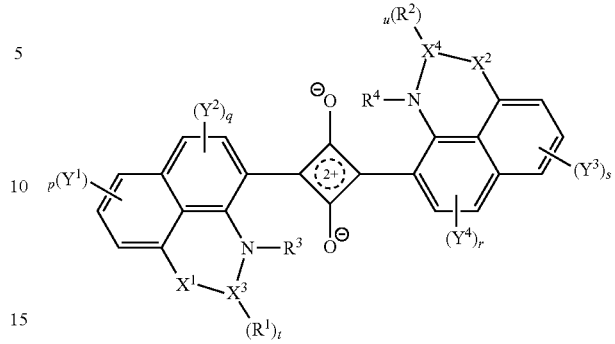

(2)

In Formula 2, $R^1$ and $R^2$ each independently represent a monovalent substituent.

$R^3$ and $R^4$ each independently represent a hydrogen atom or an alkyl group.

$X^1$ and $X^2$ each independently represent an oxygen atom or —N($R^5$)—.

$R^5$ represents a hydrogen atom, an alkyl group, an aryl group, or a heteroaryl group.

$X^3$ and $X^4$ each independently represent a carbon atom or a boron atom.

t and u each represent 1 in a case where $X^3$ and $X^4$ represent a boron atom, and each represent 2 in a case where $X^3$ and $X^4$ represent a carbon atom.

$Y^1$, $Y^2$, $Y^3$ and $Y^4$ each independently represent a monovalent substituent. $Y^1$, $Y^2$, $Y^3$, and $Y^4$ may be bonded to each other to form a ring.

In a case where there is a plurality of $Y^1$'s, a plurality of $Y^2$'s, a plurality of $Y^3$'s, and a plurality of $Y^4$'s, $Y^1$'s, $Y^2$'s, $Y^3$'s, and $Y^4$'s may be bonded to each other to form a ring.

p and s each independently represent an integer of 0 to 3, and q and r each independently represent an integer of 0 to 2.

[$R^1$ and $R^2$]

$R^1$ and $R^2$ may be the same as or different from each other. It is preferable that $R^1$ and $R^2$ be the same as each other. In a case where t and u each represent 2, two $R^1$'s may be the same as or different from each other and two $R^2$'s may be the same as or different from each other. It is preferable that two $R^1$'s be the same as each other and two $R^2$'s be the same as each other.

Examples of the monovalent substituent represented by $R^1$ and $R^2$ include the same monovalent substituents as $G^A$ and $G^B$. As $R^1$ and $R^2$, among the above, an aryl group is preferable. The aryl group may have a monovalent substituent or may be unsubstituted. The number of carbon atoms in the aryl group is preferably 6 to 30, more preferably 6 to 20, and even more preferably 6 to 14.

[$Y^1$, $Y^2$, $Y^3$, and $Y^4$]

Examples of the monovalent substituent represented by $Y^1$, $Y^2$, $Y^3$, and $Y^4$ include the same monovalent substituents as $G^A$ and $G^B$.

[p, q, r, and s]

p, q, r and s are preferably 0. That is, it is preferable that Formula 2 be devoid of $Y^1$, $Y^2$, $Y^3$, and $Y^4$.

[$X^1$ and $X^2$]

$X^1$ and $X^2$ may be the same as or different from each other. It is preferable that $X^1$ and $X^2$ be the same as each other. It is preferable that $X^1$ and $X^2$ be —N($R^5$)—.

[R⁵]

The alkyl group, the aryl group, and the heteroaryl group represented by $R^5$ may be unsubstituted or may have a monovalent substituent. Examples of the monovalent substituent include the same monovalent substituents as $G^A$ and $G^B$.

The number of carbon atoms in the alkyl group is preferably 1 to 20, more preferably 1 to 10, even more preferably 1 to 4, and particularly preferably 1 or 2. The alkyl group may be linear or branched.

The aryl group preferably has 6 to 20 carbon atoms, and more preferably has 6 to 12 carbon atoms.

The heteroaryl group may be monocyclic or polycyclic. The number of heteroatoms configuring the ring of the heteroaryl group is preferably 1 to 3. The heteroatom configuring the ring of the heteroaryl group is preferably a nitrogen atom, an oxygen atom, or a sulfur atom. The number of carbon atoms configuring the ring of the heteroaryl group is preferably 3 to 30, more preferably 3 to 18, and even more preferably 3 to 12.

$R^5$ is preferably a hydrogen atom, a methyl group, or an ethyl group, more preferably a hydrogen atom or a methyl group, and even more preferably a hydrogen atom.

[$X^3$ and $X^4$]

$X^3$ and $X^4$ may be the same as or different from each other. It is preferable that $X^3$ and $X^4$ be the same as each other. It is preferable that $X^3$ and $X^4$ be a boron atom.

[$R^3$ and $R^4$]

The number of carbon atoms in the alkyl group represented by $R^3$ and $R^4$ is preferably 1 to 4, and more preferably 1 or 2. The alkyl group may be linear or branched. Examples of the alkyl group include a methyl group, an ethyl group, a n-propyl group, an isopropyl group, a n-butyl group, and an isobutyl group. $R^3$ and $R^4$ preferably each independently represent a hydrogen atom, a methyl group, or an ethyl group, more preferably each independently represent a hydrogen atom or a methyl group, and even more preferably each independently represent a hydrogen atom.

The molecular weight of the near-infrared absorbing colorant represented by Formula 1 is preferably 100 to 2,000, and more preferably 150 to 1,000.

The near-infrared absorbing colorant represented by Formula 1 is specifically described in JP2011-2080101A, and the compounds described in JP2011-2080101A can be suitably used as the squarylium dye in the present disclosure.

The near-infrared absorbing colorant represented by Formula 1 and the near-infrared absorbing colorant represented by Formula 2 may be tautomers thereof. For the tautomers, for example, what are described in paragraph "0034" of WO2016/136783A can be referred to.

Specific examples (Specific Examples B-1 to B-40) of the near-infrared absorbing colorant represented by Formula 1 or Formula 2 will be shown below. However, in the present disclosure, the near-infrared absorbing colorants are not limited to the following compounds. In the formulas, "Me" represents a methyl group, "Ph" represents a phenyl group, and "Ac" represents an acetyl group.

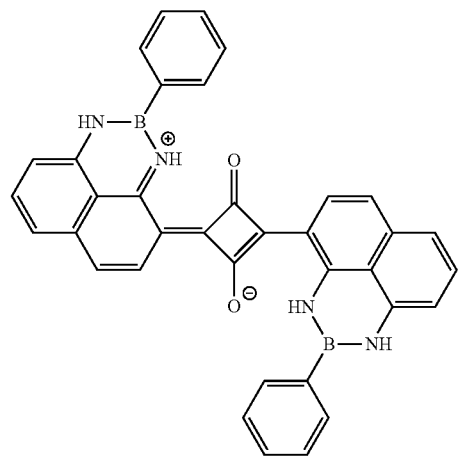

B-1

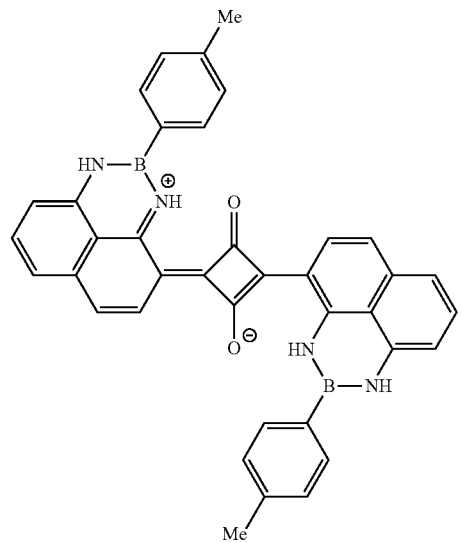

B-2

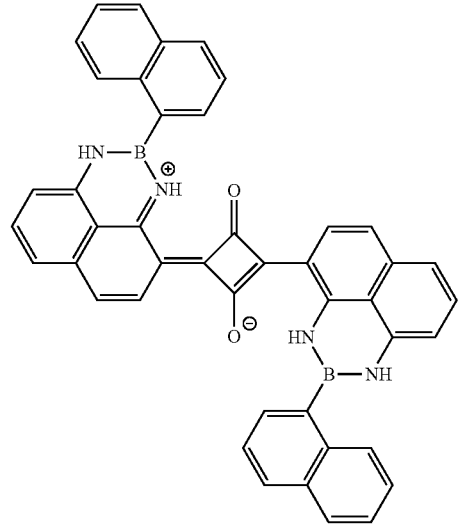

B-3

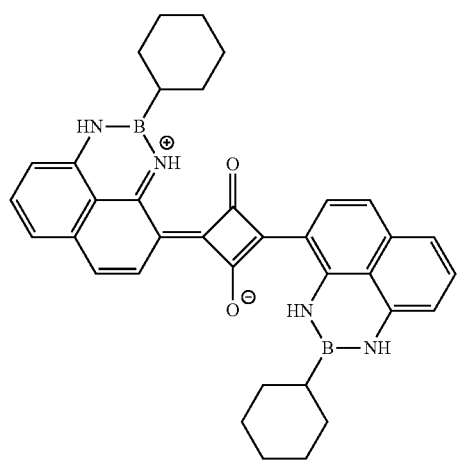
B-4
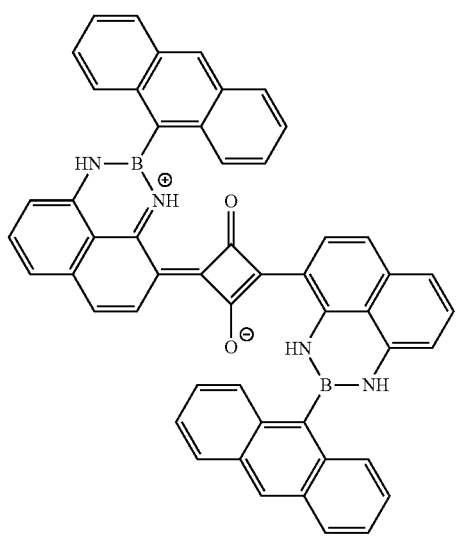
B-7
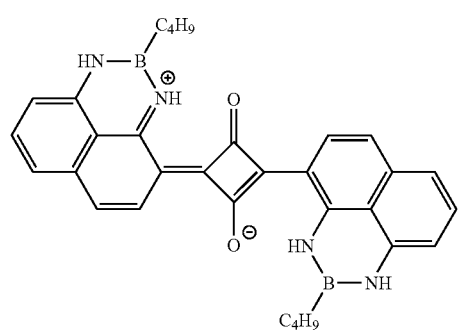
B-5
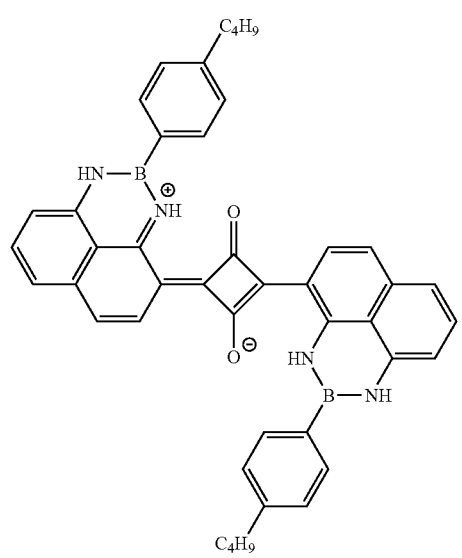
B-6
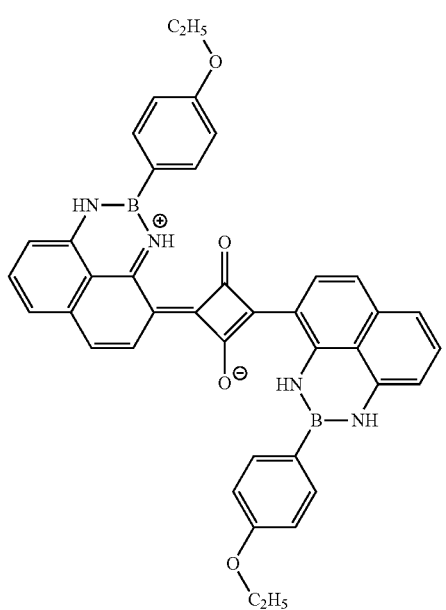
B-8

B-9
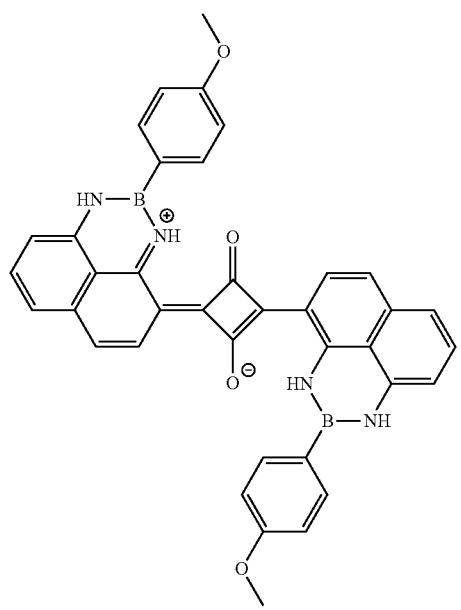
B-10
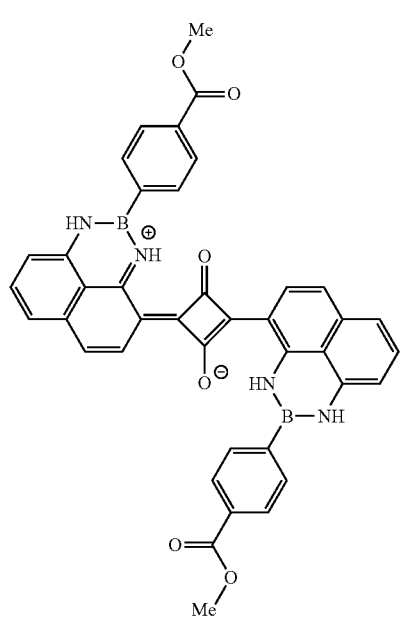
B-11
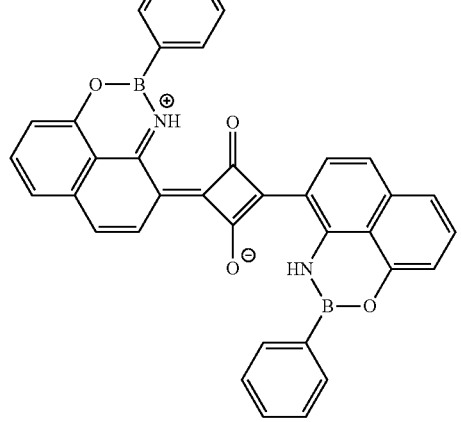
B-12
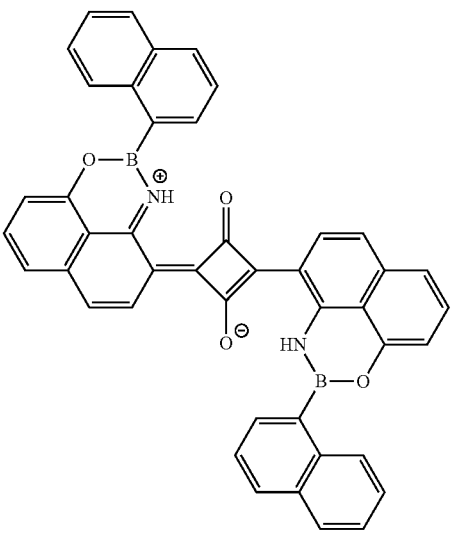
B-13
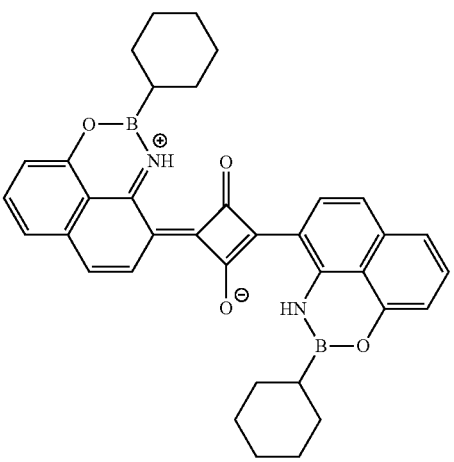
B-14
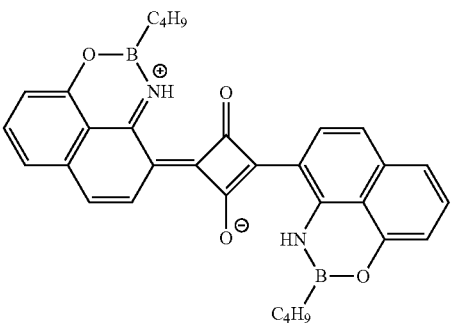

-continued
B-15
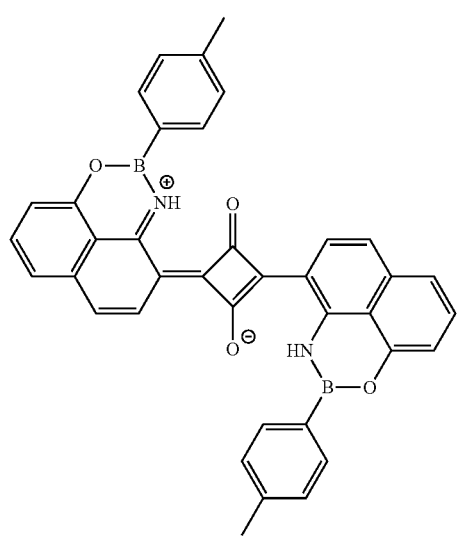
B-16
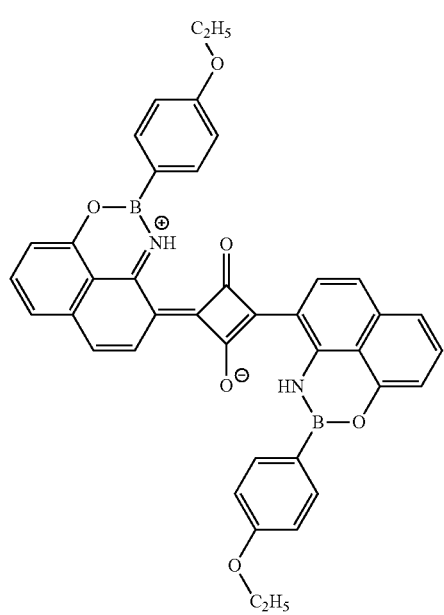
B-17
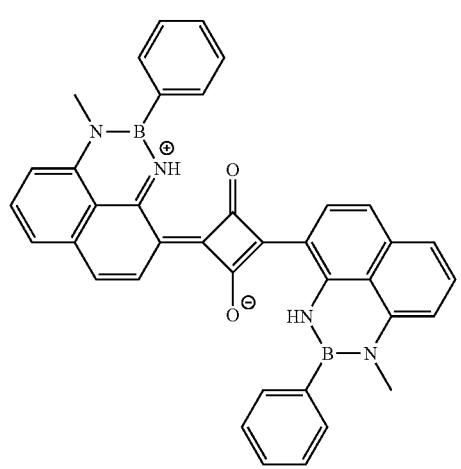
-continued
B-18
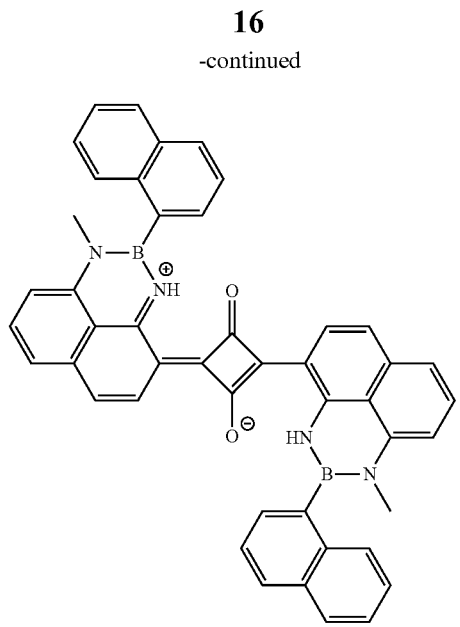
B-19
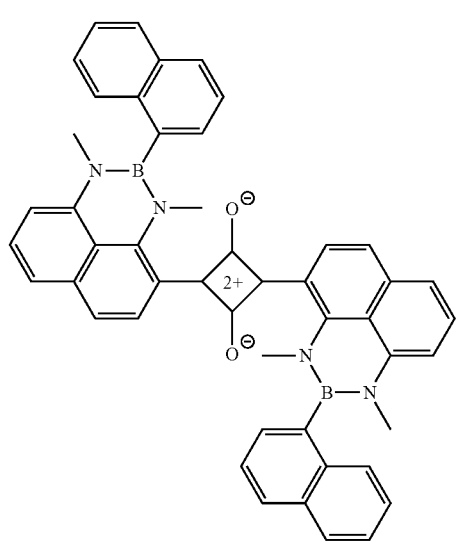
B-20
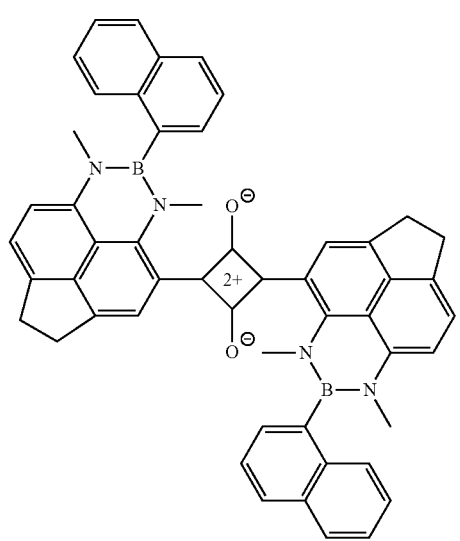

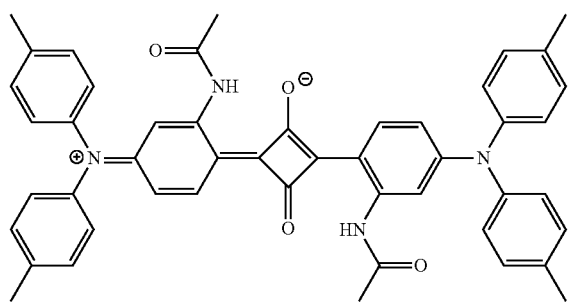
B-21
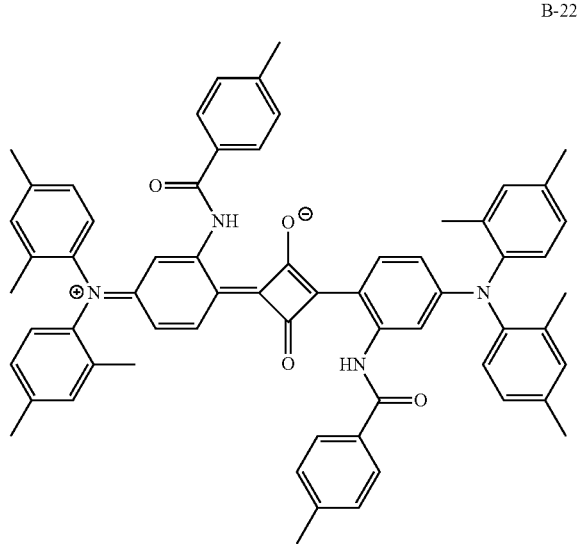
B-22
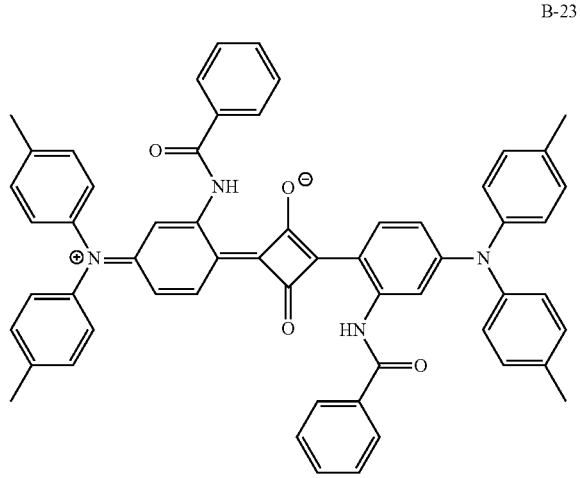
B-23
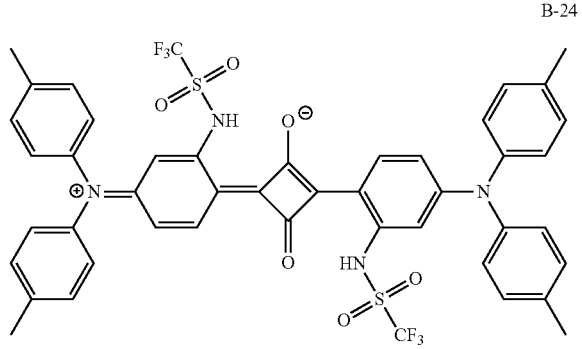
B-24
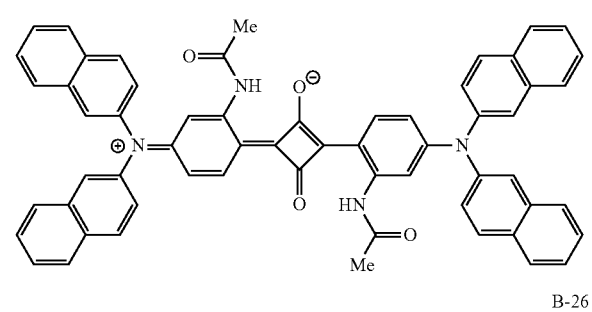
B-25
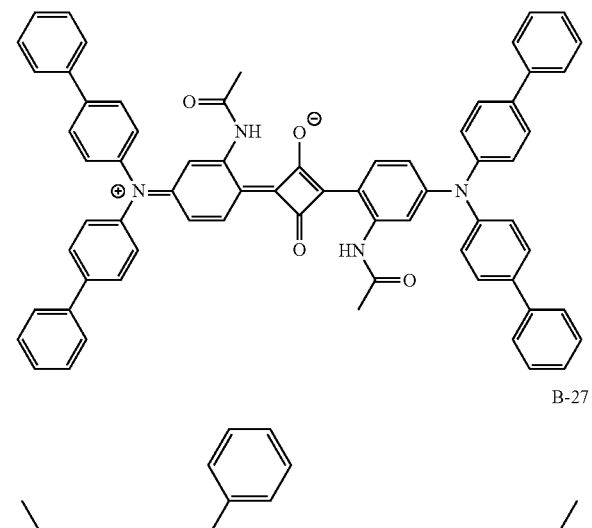
B-26
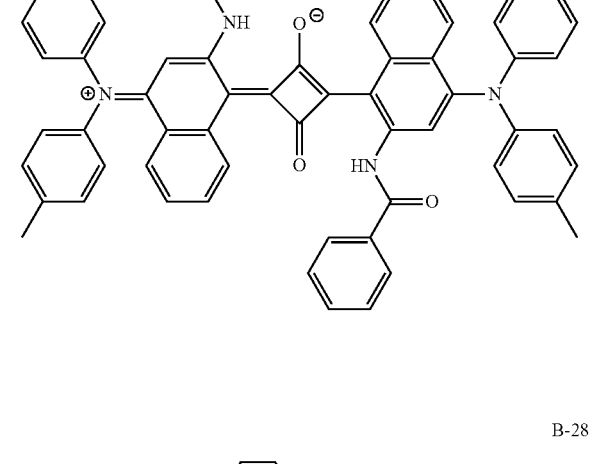
B-27
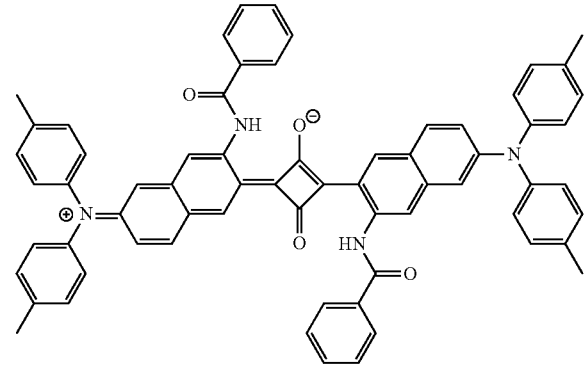
B-28

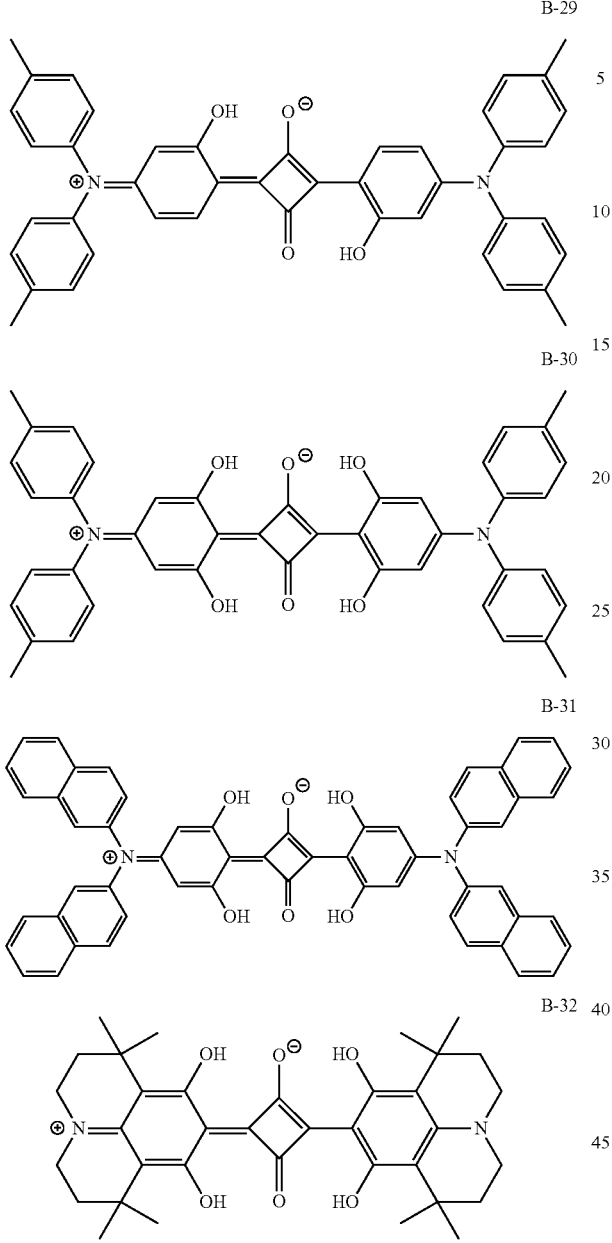
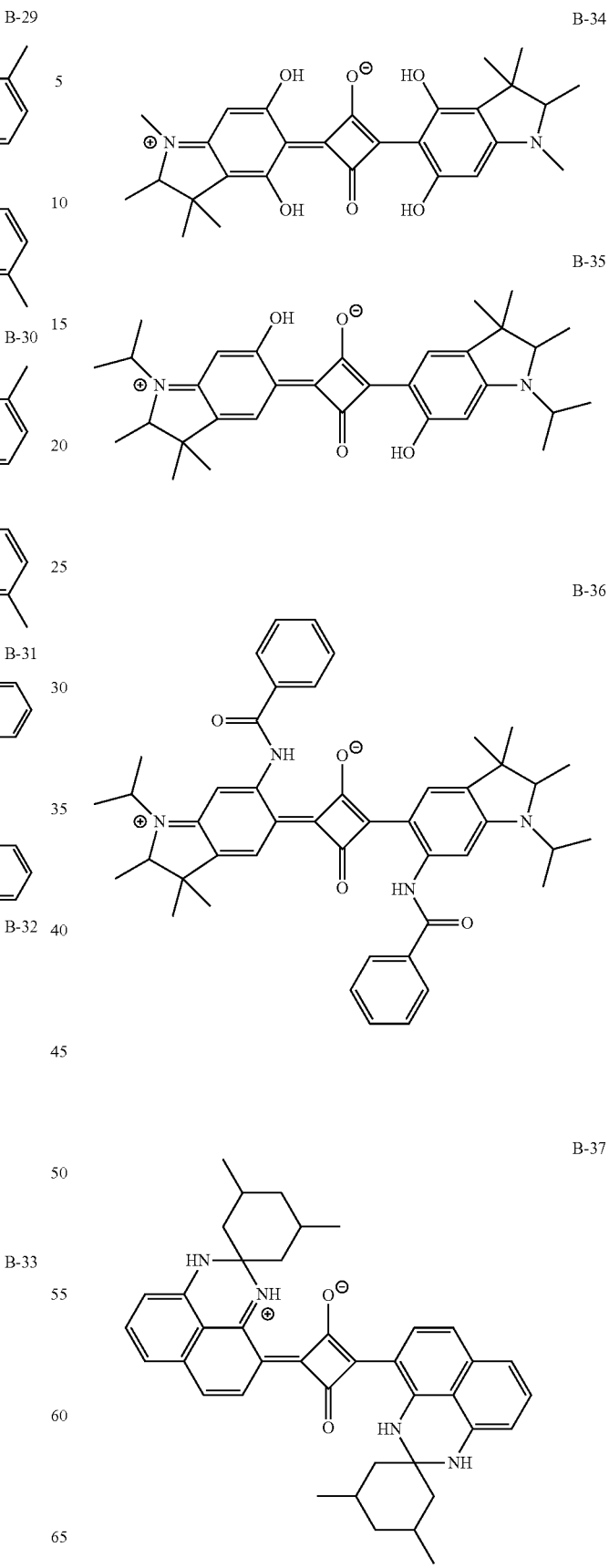

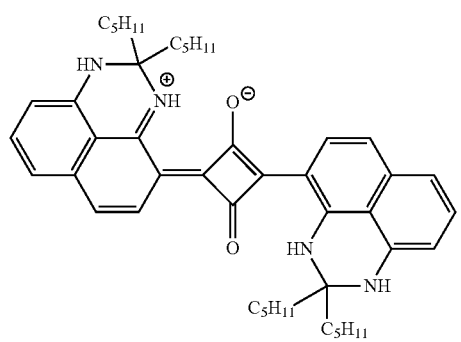
B-38
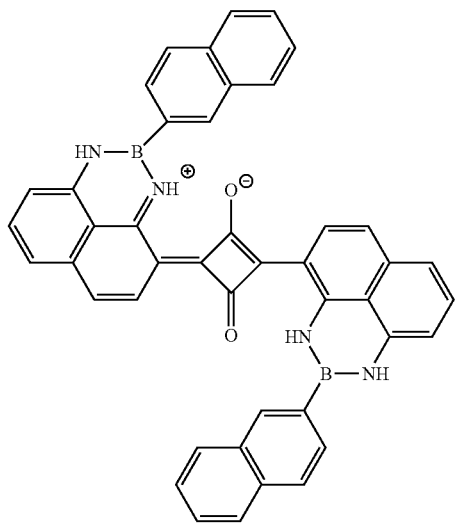
B-41
B-39
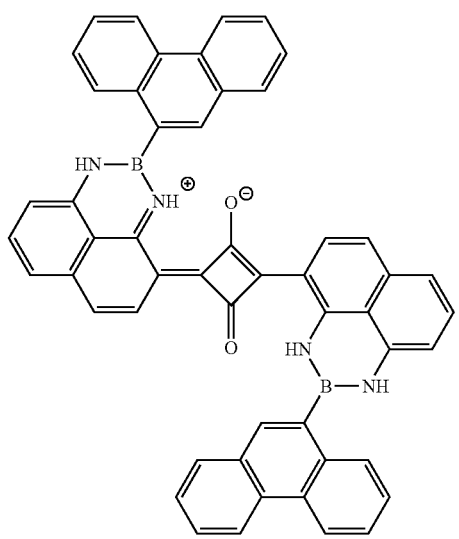
B-42
B-40
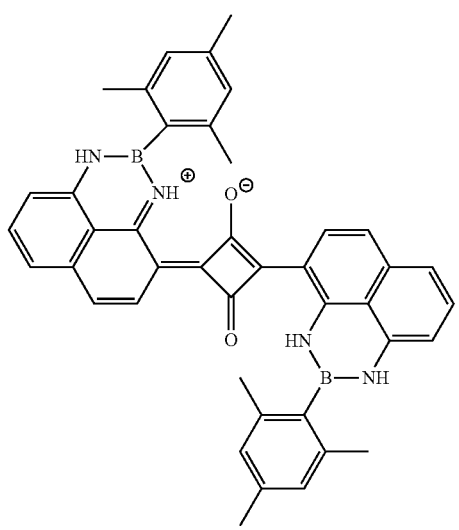
B-43

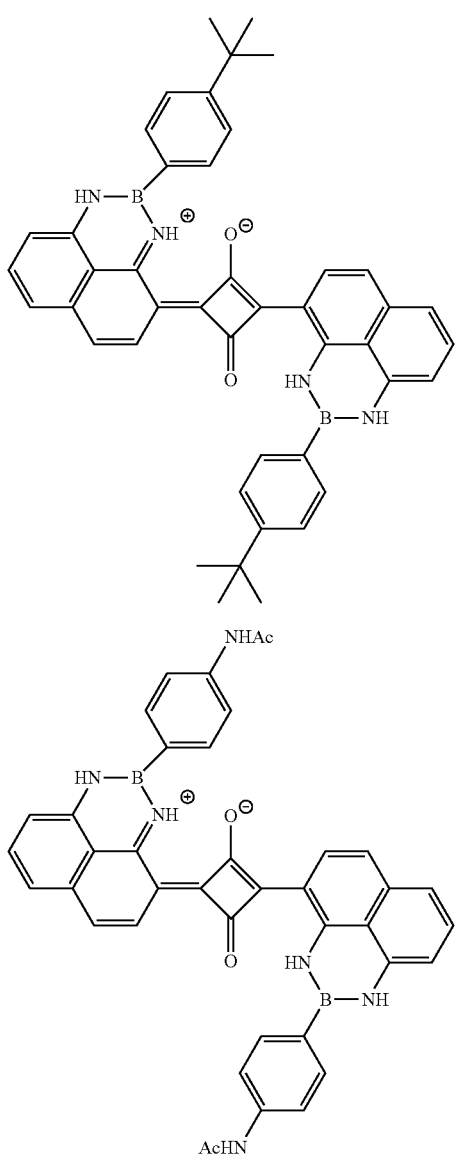

B-44

B-45

From the viewpoint of improving the readability and the readability after the passage of time, the near-infrared absorbing colorant represented by Formula 1 is preferably Specific Example B-1, B-3, B-7, B-37, B-41, B-42, B-43, B-44, or B-45.

It is preferable that the near-infrared absorbing colorant represented by Formula 1 be dispersed in the form of particles in the ink. From the viewpoint of light resistance, the volume-average particle size of the near-infrared absorbing colorant represented by Formula 1 is preferably 10 nm or more, more preferably 15 nm or more, even more preferably 20 nm or more, and particularly preferably 50 nm or more. From the viewpoint of dispersibility and jettability, the volume-average particle size of the near-infrared absorbing colorant represented by Formula 1 is preferably 400 nm or less, more preferably 300 nm or less, and even more preferably 200 nm or less.

In a case where the near-infrared absorbing colorant is coated with a dispersant or the like, the volume-average particle size of the near-infrared absorbing colorant refers to the volume-average particle size of the coated near-infrared absorbing colorant.

The volume-average particle size can be measured by a dynamic light scattering method using Zetasizer Nano ZS (manufactured by Malvern Panalytical Ltd) as a measuring device.

It is preferable that the near-infrared absorbing colorant be dispersed using a disperser. Examples of the disperser include a circulation-type beads mill, a ball mill, a sand mill, an attritor, a roll mill, an agitator, a Henschel mixer, a colloid mill, an ultrasound homogenizer, a pearl mill, a wet-type jet mill, and a paint shaker.

The content of the near-infrared absorbing colorant represented by Formula 1 with respect to the total amount of the ink is preferably 0.1% by mass to 20% by mass, more preferably 0.1% by mass to 10% by mass, and even more preferably 0.3% by mass to 7% by mass.

(Polymerizable Monomers)

The ink according to the present disclosure contains polymerizable monomers. The ink may contain one polymerizable monomer or two or more polymerizable monomers.

In the present disclosure, a monomer means a compound having a molecular weight less than 1,000. A polymerizable monomer means a compound having a polymerizable group and having a molecular weight less than 1,000.

The molecular weight of the polymerizable monomer is preferably 100 or more and less than 1,000, more preferably 100 to 800, and even more preferably 150 to 700. The molecular weight of the polymerizable monomer is calculated from the type and number of atoms constituting the polymerizable monomer.

Examples of the polymerizable monomers include a photopolymerizable monomer having a polymerization reaction that proceeds by light irradiation, and a thermopolymerizable monomer having a polymerization reaction that proceeds by heating or infrared irradiation. Examples of the photopolymerizable monomer include a polymerizable monomer having a radically polymerizable group that can be radically polymerized (that is, a radically polymerizable monomer) and a polymerizable monomer having a cationically polymerizable group that can be cationically polymerized (that is, a cationically polymerizable monomer). As the polymerizable monomers, among these, a photopolymerizable monomer is preferable, and a radically polymerizable monomer is more preferable.

The radically polymerizable monomer is preferably an ethylenically unsaturated monomer having an ethylenically unsaturated group. Examples of the ethylenically unsaturated monomer include a monofunctional ethylenically unsaturated monomer and a polyfunctional ethylenically unsaturated monomer.

The monofunctional ethylenically unsaturated monomer is a monomer having one ethylenically unsaturated group. Examples thereof include a monofunctional (meth)acrylate, a monofunctional (meth)acrylamide, a monofunctional aromatic vinyl compound, a monofunctional vinyl ether, and a monofunctional N-vinyl compound.

Examples of the monofunctional (meth)acrylate include methyl (meth)acrylate, ethyl (meth)acrylate, propyl (meth)acrylate, n-butyl (meth)acrylate, hexyl (meth)acrylate, 2-ethylhexyl (meth)acrylate, tert-octyl (meth)acrylate, isoamyl (meth)acrylate, decyl (meth)acrylate, isodecyl (meth)acrylate, lauryl (meth)acrylate, stearyl (meth)acrylate, isostearyl (meth)acrylate, cyclohexyl (meth)acrylate, 4-n-butylcyclohexyl (meth)acrylate, 4-tert-butylcyclohexyl (meth)acrylate, bornyl (meth)acrylate, isobornyl (meth)

acrylate, 2-ethylhexyldiglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, 2-(2-methoxyethoxy)ethyl (meth)acrylate, 2-(2-butoxyethoxy)ethyl (meth)acrylate, ethyl carbitol (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, 2-phenoxymethyl (meth)acrylate, 2-phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxybutyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, polyethylene oxide (meth)acrylate, polyethylene oxide monoalkyl ether (meth)acrylate, dipropylene glycol (meth)acrylate, polypropylene oxide monoalkyl ether (meth)acrylate, 2-methacryloyloxyethyl succinate, 2-methacryloyloxyhexahydrophthalic acid, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, ethylene oxide (EO)-modified phenol (meth)acrylate, EO-modified cresol (meth)acrylate, EO-modified nonylphenol (meth)acrylate, propylene oxide (PO)-modified nonylphenol (meth)acrylate, EO-modified-2-ethylhexyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, phenoxyethylene glycol (meth)acrylate, and cyclic trimethylolpropane formal (meth)acrylate.

Examples of the monofunctional (meth)acrylamide include (meth)acrylamide, N-methyl (meth)acrylamide, N-ethyl (meth)acrylamide, N-propyl (meth)acrylamide, N-n-butyl (meth)acrylamide, N-t-butyl (meth)acrylamide, N-butoxymethyl (meth)acrylamide, N-isopropyl (meth)acrylamide, N-methylol (meth)acrylamide, N,N-dimethyl (meth)acrylamide, N,N-diethyl (meth)acrylamide, and (meth)acryloylmorpholine.

Examples of the monofunctional aromatic vinyl compound include styrene, dimethylstyrene, trimethylstyrene, isopropylstyrene, chloromethylstyrene, methoxystyrene, acetoxystyrene, chlorostyrene, dichlorostyrene, bromostyrene, vinyl benzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allyl styrene, isopropenyl styrene, butenyl styrene, octenyl styrene, 4-t-butoxycarbonyl styrene, and 4-t-butoxystyrene.

Examples of the monofunctional vinyl ether include methyl vinyl ether, ethyl vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexyl methyl vinyl ether, 4-methylcyclohexyl methyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethylcyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Examples of the monofunctional N-vinyl compound include N-vinyl-ε-caprolactam and N-vinylpyrrolidone.

From the viewpoint of improving curing properties, the monofunctional ethylenically unsaturated compound is preferably a compound having a ring structure. Examples of the monofunctional ethylenically unsaturated compound having a ring structure include monofunctional (meth)acrylates having a ring structure such as cyclohexyl (meth)acrylate, 4-n-butylcyclohexyl (meth)acrylate, 4-tert-butylcyclohexyl (meth)acrylate, bornyl (meth)acrylate, isobornyl (meth)acrylate, benzyl (meth)acrylate, 4-butylphenyl (meth)acrylate, phenyl (meth)acrylate, 2,4,5-tetramethylphenyl (meth)acrylate, 4-chlorophenyl (meth)acrylate, 2-phenoxymethyl (meth)acrylate, 2-phenoxyethyl (meth)acrylate, dicyclopentenyl (meth)acrylate, dicyclopentenyloxyethyl (meth)acrylate, dicyclopentanyl (meth)acrylate, (3-ethyl-3-oxetanylmethyl) (meth)acrylate, phenoxyethylene glycol (meth)acrylate, and cyclic trimethylolpropane formal (meth)acrylate;

monofunctional aromatic vinyl compounds;

monofunctional vinyl ethers having a ring structure such as cyclohexyl vinyl ether, cyclohexyl methyl vinyl ether, 4-methylcyclohexyl methyl vinyl ether, benzyl vinyl ether, dicyclopentenyl vinyl ether, 2-dicyclopentenoxyethyl vinyl ether, phenylethyl vinyl ether, and phenoxypolyethylene glycol vinyl ether; and monofunctional N-vinyl compounds having a ring structure such as N-vinyl-ε-caprolactam and N-vinylpyrrolidone.

The polyfunctional ethylenically unsaturated monomer is a monomer having two or more ethylenically unsaturated groups, and examples thereof include a polyfunctional (meth)acrylate and a polyfunctional vinyl ether.

Examples of the polyfunctional (meth)acrylate include ethylene glycol di(meth)acrylate, diethylene glycol di(meth)acrylate, triethylene glycol di(meth)acrylate, propylene glycol di(meth)acrylate, dipropylene glycol di(meth)acrylate, tripropylene glycol di(meth)acrylate, polyethylene glycol di(meth)acrylate, polypropylene glycol di(meth)acrylate, butylene glycol di(meth)acrylate, tetraethylene glycol di(meth)acrylate, neopentyl glycol di(meth)acrylate, 3-methyl-1,5-pentanediol di(meth)acrylate, hexanediol di(meth)acrylate, heptanediol di(meth)acrylate, EO-modified neopentyl glycol di(meth)acrylate, PO-modified neopentyl glycol di(meth)acrylate, EO-modified hexanediol di(meth)acrylate, PO-modified hexanediol di(meth)acrylate, octanediol di(meth)acrylate, nonanediol di(meth)acrylate, decanediol di(meth)acrylate, dodecanediol di(meth)acrylate, 1,6-hexanediol di(meth)acrylate, glycerin di(meth)acrylate, pentaerythritol di(meth)acrylate, ethylene glycol diglycidyl ether di(meth)acrylate, diethylene glycol diglycidyl ether di(meth)acrylate, tricyclodecanedimethanol di(meth)acrylate, trimethylolethane tri(meth)acrylate, trimethylolpropane tri(meth)acrylate, trimethylolpropane EO-added tri(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, tri(meth)acryloyloxyethoxytrimethylolpropane, glycerin polyglycidyl ether poly(meth)acrylate, tris(2-acryloyloxyethyl) isocyanurate, and 2-(2-vinyloxyethoxy) ethyl (meth)acrylate.

Examples of the polyfunctional vinyl ether include 1,4-butanediol divinyl ether, ethylene glycol divinyl ether, diethylene glycol divinyl ether, triethylene glycol divinyl ether, polyethylene glycol divinyl ether, propylene glycol divinyl ether, butylene glycol divinyl ether, hexanediol divinyl ether, 1,4-cyclohexanedimethanol divinyl ether, bisphenol A alkylene oxide divinyl ether, bisphenol F alkylene oxide divinyl ether, trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, EO-added trimethylolpropane trivinyl ether, PO-added trimethylolpropane trivinyl ether, EO-added ditrimethylolpropane tetravinyl ether, PO-added ditrimethylolpropane tetravinyl ether, EO-added pentaerythritol tetravinyl ether, PO-added pentaerythritol tetravinyl ether, EO-added dipentaerythritol hexavinyl ether, and PO-added dipentaerythritol hexavinyl ether.

From the viewpoint of improving curing properties, the polyfunctional ethylenically unsaturated monomer is preferably a compound having an oxygen atom. The ratio of the number of oxygen atoms to the number of carbon atoms contained in one molecule of the polyfunctional ethylenically unsaturated monomer is preferably 0.2 or more, and more preferably 0.3 or more. The upper limit of the ratio is not particularly limited, but is, for example, 0.5. Examples of the compound in which the ratio of the number of oxygen atoms to the number of carbon atoms contained in one molecule is 0.2 or more include polyethylene glycol diacrylate.

The polymerizable monomers may be the commercially available products described in Shinzo Yamashita, "Handbook of Crosslinking Agents" (1981, Taiseisha); Kiyomi Kato, "UV•EB Curing Handbook (Raw Materials)" (1985, Kobunshi Kankokai); RadTech Japan, "Application and Market of UV•EB Curing Technology", p. 79, (1989, CMC); Eiichiro Takiyama, "Polyester Resin Handbook", (1988, NIKKAN KOGYO SHIMBUN, LTD.), and the like.

The ink according to the present disclosure preferably contains polyfunctional polymerizable monomers and more preferably contains a monofunctional polymerizable monomer and a polyfunctional polymerizable monomer, as polymerizable monomers. Incorporating polyfunctional polymerizable monomers into the ink makes it possible to record an image having excellent curing properties. Furthermore, incorporating polyfunctional polymerizable monomers into the ink makes it possible to suppress the phenomenon (so-called migration) where the unreacted polymerizable monomers are transferred to the outside from the article with a recorded image. Particularly, the ink containing polyfunctional polymerizable monomers is excellent because such an ink is applicable to packaging materials in the field of food packaging and cosmetic packaging where the safety of substrates is strictly required.

From the viewpoint of curing properties, the proportion of the polyfunctional polymerizable monomers in the polymerizable monomers contained in the ink is preferably 50% by mass or more, and more preferably 60% by mass or more. The upper limit of the proportion of the polyfunctional polymerizable monomers in the polymerizable monomers contained in the ink is not particularly limited, and may be 100% by mass.

In the present disclosure, from the viewpoint of improving the readability after a rub test and improving the solvent resistance, a glass transition temperature (Tg) of the polymerizable monomers is preferably 30° C. or higher, and more preferably 60° C. or higher. Particularly, in the polymerizable monomers, a proportion of a polymerizable monomer having a glass transition temperature of 30° C. or higher is preferably 90% by mass or more, and more preferably 92% by mass or more. The upper limit of the proportion is not particularly limited, and is, for example, 100% by mass. In a case where the proportion of the polymerizable monomer having a glass transition temperature of 30° C. or higher is 90% by mass or more in the polymerizable monomers, the readability after a rub test is further improved. Examples of the polymerizable monomer having a Tg of 30° C. or higher include isobornyl (meth)acrylate (Tg: 97° C.).

The glass transition temperature (Tg) of a polymerizable monomer means a glass transition temperature that the polymerizable monomer has in a homopolymer state. By the addition of any polymerization initiator to the polymerizable monomer, a homopolymer having a weight-average molecular weight of 10,000 to 20,000 is obtained. The glass transition temperature (Tg) of the homopolymer having a weight-average molecular weight of 10,000 to 20,000 is adopted as the glass transition temperature of the polymerizable monomer. Although the glass transition temperature (Tg) of the homopolymer varies with the weight-average molecular weight thereof, the change in Tg caused by the variation in weight-average molecular weight in a range of 10,000 to 20,000 is negligible. The weight-average molecular weight means a value measured by gel permeation chromatography (GPC). For the measurement by GPC, HLC (registered trademark)-8020GPC (manufactured by TOSOH CORPORATION) is used as a measuring device, three TSKgel (registered trademark) Super Multipore HZ-H (4.6 mm ID×15 cm, manufactured by TOSOH CORPORATION) columns are used as columns, and tetrahydrofuran (THF) is used as an eluent. The measurement is performed using an RI detector under the conditions of a sample concentration of 0.45% by mass, a flow rate of 0.35 ml/min, a sample injection amount of 10 µl, and a measurement temperature of 40° C. The calibration curve is plotted from 8 samples of "Standard sample TSK standard, polystyrene" manufactured by TOSOH CORPORATION: "F-40", "F-20", "F-4", "F-1", "A-5000", "A-2500", "A-1000", and "n-propylbenzene".

The glass transition temperature (Tg) is measured using a differential scanning calorimeter (DSC) based on ASTMD3418-8. For example, the glass transition temperature (Tg) is measured under general measurement conditions by using a differential scanning calorimeter (trade name "EXSTAR6220") manufactured by SII NanoTechnology Inc.

The content of the polymerizable monomers with respect to the total amount of the ink is 50% by mass or more, more preferably 60% by mass to 95% by mass, and even more preferably 70% by mass to 90% by mass. In a case where the content of the polymerizable monomers is 50% by mass or more, the obtained article with a recorded image has excellent readability.

The SP value of the polymerizable monomers is not particularly limited as long as the difference between the SP value of the polymerizable monomers and the SP value of the dispersant, which will be described later, is 3.8 $MPa^{1/2}$ to 16.0 $MPa^{1/2}$. From the viewpoint of curing properties and dispersion stability, the SP value of the polymerizable monomers is preferably 15.0 $MPa^{1/2}$ to 30.0 $MPa^{1/2}$, and more preferably 17.0 $MPa^{1/2}$ to 20.0 $MPa^{1/2}$.

In the present disclosure, the SP value of a polymerizable monomer means the Hansen solubility parameters. The Hansen solubility parameters are obtained by dividing the solubility parameters introduced by Hildebrand into three components, a dispersion element δd, a polarity element δp, and a hydrogen bond element δh, and expressing the parameters in a three-dimensional space.

An SP value δ of the polymerizable monomers is a value calculated using the following Equation A.

$$SP \text{ value } (\delta) \, [\text{MPa}^{1/2}] = (\delta d^2 + \delta p^2 + \delta h^2)^{1/2} \quad (A)$$

The dispersion element δd, the polarity element δp, and the hydrogen bond element δh are calculated using HSPiP (version 4.1.07) software.

Table 1 shows the dispersion element δd, the polarity element δp, the hydrogen bond element δh, and the SP value of 3-methyl-1,5-pentanediol diacrylate (MPDDA), dipropylene glycol diacrylate (DPGDA), isobornyl acrylate (IBOA), tricyclodecane dimethanol diacrylate (TCDDMDA), trimethylolpropane triacrylate (TMPTA), acryloylmorpholine (ACMO), EO-added trimethylolpropane triacrylate (EOTMPTA), and phenoxyethyl acrylate (PEA).

TABLE 1

|  | Dispersion element δd [MPa$^{1/2}$] | Polarity element δp [MPa$^{1/2}$] | Hydrogen bond element δh [MPa$^{1/2}$] | SP value [MPa$^{1/2}$] |
|---|---|---|---|---|
| MPDDA | 16.4 | 3.7 | 5.2 | 17.60 |
| DPGDA | 16.4 | 3.9 | 5.5 | 17.73 |
| IBOA | 16.7 | 2.5 | 2.7 | 17.10 |
| TCDDMDA | 17.2 | 3 | 3.7 | 17.85 |
| TMPTA | 16.4 | 2.6 | 5.3 | 17.43 |
| ACMO | 18.5 | 11.2 | 5.8 | 22.39 |
| EOTMPTA | 16.2 | 2.6 | 6.7 | 17.72 |
| PEA | 17.8 | 5 | 6 | 19.44 |

In a case where an ink contains two or more polymerizable monomers, the SP value of the polymerizable monomers is calculated by using the following method. First, as δd, δp, and δh, the weighted averages of the dispersion element, polarity element, and hydrogen bond element of the polymerizable monomers contained in the ink are calculated. Then, based on the calculated δd, δp, and δh, the SP value is calculated using the above Equation A.

In a case where the ink contains two or more polymerizable monomers, δd is calculated using the following Equation B1. In Equation B1, $\delta_{dm}$ represents a dispersion element of the nth polymerizable monomer (m represents an integer of 1 or more) in the polymerizable monomers, and $W_m$ represents a ratio of a content (% by mass) of the mth polymerizable monomer to the total amount of the ink.

$$\delta d = \Sigma \delta d_m W_m / \Sigma W_m \quad (B1)$$

Likewise, in a case where the ink contains two or more polymerizable monomers, δp and δh are calculated by the following Equation B2 and Equation B3.

$$\delta p = \Sigma \delta p_m W_m / \Sigma W_m \quad (B2)$$

$$\delta h = \Sigma \delta h_m W_m / \Sigma W_m \quad (B3)$$

In Equation B2, $\delta p_m$ represents a polarity element of the mth polymerizable monomer (m represents an integer of 1 or more) in the polymerizable monomers.

In Equation B3, $\delta h_m$ represents a hydrogen bond element of the mth polymerizable monomer (m represents an integer of 1 or more) in the polymerizable monomers.

(Dispersant)

The ink according to the present disclosure contains a dispersant. The dispersant has a function of dispersing the squarylium dye represented by Formula 1.

The weight-average molecular weight of the dispersant is preferably 100,000 or less, more preferably 75,000 or less, and even more preferably 50,000 or less. Furthermore, the weight-average molecular weight of the dispersant is preferably 1,000 or more, more preferably 2,000 or more, and even more preferably 3,000 or more. In a case where the weight-average molecular weight of the dispersant is 100,000 or less, the diffusion rate of the dispersant in a dispersion medium is improved. Therefore, an article with a recorded image having excellent readability is obtained. On the other hand, in a case where the weight-average molecular weight of the dispersant is 1000 or more, the compatibility with a dispersion medium is not too high, which makes it possible to stably disperse the near-infrared absorbing colorant represented by Formula 1 by the dispersant.

The weight-average molecular weight means a value measured by gel permeation chromatography (GPC). For THE measurement by gel permeation chromatography (GPC), HLC (registered trademark)-8020GPC (manufactured by TOSOH CORPORATION) is used as a measuring device, three TSKgel (registered trademark) Super Multipore HZ-H (4.6 mm ID×15 cm, manufactured by TOSOH CORPORATION) columns are used as columns, and tetrahydrofuran (THF) is used as an eluent. The measurement is performed using an RI detector under the conditions of a sample concentration of 0.45% by mass, a flow rate of 0.35 ml/min, a sample injection amount of 10 μl, and a measurement temperature of 40° C. The calibration curve is plotted from 8 samples of "Standard sample TSK standard, polystyrene" manufactured by TOSOH CORPORATION: "F-40", "F-20", "F-4", "F-1", "A-5000", "A-2500", "A-1000", and "n-propylbenzene".

The dispersant is preferably a polymer, and the polymer may be any of a random polymer, a block polymer, and a graft polymer.

Among the above, from the viewpoint of the readability after the passage of time, a block polymer is preferable as the dispersant. The block polymer has, for example, an adsorption block having an adsorptive group that is adsorbed onto the near-infrared absorbing colorant represented by Formula 1 and a dispersant-friendly block that has a functional group having affinity with a dispersion medium. In the block polymer, the adsorptive group has low shielding properties and high mobility. Therefore, the block polymer is adsorbed onto the near-infrared absorbing colorant represented by Formula 1 at a high rate. Accordingly, in a case where the dispersant is a block polymer, the readability is further improved. In addition, in the block polymer, the adsorptive groups are gathered. Therefore, the block polymer has a high adsorption force to the near-infrared absorbing colorant represented by Formula 1. As a result, in a case where the dispersant is a block polymer, the readability after the passage of time is further improved.

It is preferable that the dispersant have a basic functional group or an acidic functional group. In a case where a pigment derivative, which will be described later, is incorporated into the ink, it is preferable to combine a dispersant having a basic functional group with a pigment derivative having an acidic functional group or to combine a dispersant having an acidic functional group with a pigment derivative having a basic functional group. In a case where a dispersant having a basic functional group and a pigment derivative having an acidic functional group are incorporated in combination into the ink, due to the acid-base interaction, the pigment derivative is easily adsorbed onto the dispersant. Likewise, in a case where a dispersant having an acidic functional group and a pigment derivative having a basic functional group are incorporated in combination into the ink, due to the acid-base interaction, the pigment derivative is easily adsorbed onto the dispersant. Due to the steric repulsion between the dispersants, the near-infrared absorbing colorant represented by Formula 1 can be stably dispersed in the ink, which improves temporal stability. As a result, the readability after the passage of time is improved.

Examples of the basic functional group include an amino group, an amide group, and an imino group. The dispersant may have only one basic functional group or two or more basic functional groups.

Examples of the acidic functional group include a carboxy group and a sulfo group. The dispersant may have only one acidic functional group or two or more acidic functional groups.

In a case where a dispersant having a basic functional group is used, from the viewpoint of improving the readability and the readability after the passage of time, the base number of the dispersant is preferably 15 mgKOH/g or more, more preferably 20 mgKOH/g or more, and even more preferably 25 mgKOH/g or more. The upper limit of the base number of the dispersant is not particularly limited, but is, for example, 40 mgKOH/g.

In the present disclosure, the base number is a value measured by the perchloric acid method specified by JIS K 2501: 2003. The base number is obtained as milligrams (mg) of potassium hydroxide equivalent to hydrochloric acid or perchloric acid required to neutralize all the basic components contained in 1 g of a sample.

In a case where a dispersant having an acidic functional group is used, from the viewpoint of improving the readability and the readability after the passage of time, the acid value of the dispersant is preferably 15 mgKOH/g or more, more preferably 20 mgKOH/g or more, and even more preferably 25 mgKOH/g or more. The upper limit of the acid value of the dispersant is not particularly limited, but is, for example, 40 mgKOH/g.

In the present disclosure, the acid value is a value measured by the method described in JIS K0070: 1992. The acid value is obtained as milligrams (mg) of potassium hydroxide required to neutralize all the acidic components contained in 1 g of a sample.

The dispersant may be a commercially available product. Examples of the commercially available product include a SOLSPERSE (registered trademark) series (examples: SOLSPERSE 16000, 21000, 32000, 35000, 41000, 41090, 43000, 44000, 46000, 54000, 55000, 71000, and the like) from The Lubrizol Corporation, a DISPERBYK (registered trademark) series (examples: DISPERBYK 102, 110, 111, 118, 170, 190, 194N, 2001, 2013, 2015, 2090, 2096, and the like) from BYK-Chemie GmbH., a TEGO (registered trademark) Dispers series (examples: TEGO Dispers 610, 610S, 630, 651, 655, 750W, 755W, and the like) from Evonik Industries AG, a DISPARLON (registered trademark) series (examples: DA-375, DA-1200, and the like) from Kusumoto Chemicals, Ltd., a FLOREN series (examples: WK-13E, G-700, G-900, GW-1500, GW-1640, WK-13E, and the like) from KYOEISHA CHEMICAL Co., LTD., and EFKA (registered trademark) series (examples: EFKA PX 4701, EFKA PX 4731, EFKA PX 4732, and the like) from BASF SE.

From the viewpoint of improving the readability and the readability after the passage of time, the content of the dispersant with respect to the total amount of the ink is preferably 0.7% by mass to 5% by mass, and more preferably 0.8% by mass to 4% by mass.

The ratio of the content of the dispersant to the content of the near-infrared absorbing colorant represented by Formula 1 is preferably 0.1 to 20, more preferably 0.2 to 5, and even more preferably 0.5 to 5, based on mass.

The SP value of the dispersant is not particularly limited as long as the difference between the SP value of the polymerizable monomers and the SP value of the dispersant is 3.8 $MPa^{1/2}$ to 16.0 $MPa^{1/2}$. From the viewpoint of dispersion stability, the SP value of the dispersant is preferably 21 $MPa^{1/2}$ to 34 $MPa^{1/2}$, and more preferably 24 $MPa^{1/2}$ to 34 $MPa^{1/2}$.

The SP value of the dispersant is calculated, for example, the following K. W. SUH, J. M. CORBETT's equation (Journal of Applied Polymer Science, 12, 2359, 1968).

$$SP\ value = \{(V_{ml})^{1/2} \times \delta H + (V_{mh})^{1/2} \times \delta D\} / \{(V_{ml})^{1/2} + (V_{mh})^{1/2}\}$$

$V_{ml}$, $V_{mh}$, $\delta H$, and $\delta D$ are values calculated by adding n-hexane at a measurement temperature of 20° C. to a solution obtained by dissolving 0.5 g (solid content) of the dispersant in 10 mL of a good solvent, denoting a titer at a turbid point caused by the addition of n-hexane by H (mL), adding deionized water at a measurement temperature of 20° C. to a solution obtained by dissolving 0.5 g (solid content) of the dispersant in 10 mL of a good solvent, denoting a titer at a turbid point caused by the addition of deionized water by D (mL), and plugging H and D into the following equations.

$$V_{ml} = (\text{molecular volume of good solvent}) \times (\text{molecular volume of n-hexane}) / \{(1-V_H) \times (\text{molecular volume of n-hexane}) + V_H \times (\text{molecular volume of good solvent})\}$$

$$V_{mh} = (\text{molecular volume of good solvent}) \times (\text{molecular volume of deionized water}) / \{(1-V_D) \times (\text{molecular volume of deionized water}) + V_D \times (\text{molecular volume of good solvent})\}$$

$$V_H = H/(10+H)$$

$$V_D = D/(10+D)$$

$$\delta H = (SP\ \text{value of good solvent}) \times 10/(10+H) + (SP\ \text{value of n-hexane}) \times H/(10+H)$$

$$\delta D = (SP\ \text{value of good solvent}) \times 10/(10+D) + (SP\ \text{value of deionized water}) \times D/(10+D)$$

The molecular volume of n-hexane is 130.3 mL/mol, and the molecular volume of deionized water is 18 mL/mol. The SP value of n-hexane is 7.27 $(cal/cm^3)^{1/2}$, and the SP value of deionized water is 23.39 $(cal/cm^3)^{1/2}$.

The good solvent used to dissolve the dispersant is not particularly limited as long as it is a solvent capable of dissolving the dispersant, and can be appropriately selected. Examples of the good solvent include acetone.

The molecular volume of acetone is 74.4 mL/mol, and the SP value of acetone is 9.72 $(cal/cm^3)^{1/2}$.

In a case where acetone is used as the good solvent, 74.4 and 9.72 are plugged into the above equations as "molecular volume of good solvent" and "SP value of good solvent" respectively.

The SP value of each solvent is a value calculated using HSPiP (version 4.1.07) software.

The molecular volume (mL/mol) of each solvent is a value obtained by dividing molecular weight (g/mol) by density (g/mL).

The unit of the obtained SP value is $(cal/cm^3)^{1/2}$. The unit can be converted into $MPa^{1/2}$ from $(cal/cm^3)^{1/2}$, based on 1 $(cal/cm^3)^{1/2} \approx 2.05\ MPa^{1/2}$.

In the ink according to the present disclosure, the difference between the SP value of the polymerizable monomers and the SP value of the dispersant is $3.8\ MPa^{1/2}$ to $16.0\ MPa^{1/2}$. The difference means an absolute value of a value obtained by subtracting the SP value of one of the polymerizable monomers and the dispersant from the SP value of the other.

Presumably, in a case where the difference in Sp value is $3.8\ MPa^{1/2}$ or more, the dispersant is unlikely to be detached from the surface of the near-infrared absorbing colorant represented by Formula 1, and the dispersion stability of the near-infrared absorbing colorant represented by Formula 1 may be improved. On the other hand, presumably, in a case where the difference in SP values is $16.0\ MPa^{1/2}$ or less, the dispersant adsorbed onto the surface of the near-infrared absorbing colorant represented by Formula 1 may spread appropriately, which may make it difficult for the near-infrared absorbing colorants represented by Formula 1 to be aggregated with each other. As a result, an article with a recorded image having excellent readability is obtained. In addition, in the ink according to the present disclosure, the near-infrared absorbing colorant represented by Formula 1 can be stably dispersed for a long period of time by the dispersant, which makes it possible to obtain an article with a recorded image having excellent readability after the passage of time.

From the viewpoint of improving the readability and the readability after the passage of time, the difference in SP value is preferably $4.5\ MPa^{1/2}$ to $15.5\ MPa^{1/2}$, and more preferably $5.0\ MPa^{1/2}$ to $15.2\ MPa^{1/2}$.

(Pigment Derivative)

It is preferable that the ink according to the present disclosure further contain a pigment derivative.

The pigment derivative is a compound having a structure derived from a pigment in the molecule and having a molecular weight less than 1,000.

In a case where the ink contains a pigment derivative, the pigment derivative and the near-infrared absorbing colorant represented by Formula 1 have a π-π interaction, and the pigment derivative and the dispersant have an acid-base interaction. Therefore, the near-infrared absorbing colorant represented by Formula 1 is more stably dispersed by the dispersant, and the temporal stability of the ink is improved. As a result, the readability after the passage of time is improved.

It is preferable that the pigment derivative have a basic functional group or an acidic functional group.

Examples of the basic functional group include an amino group, an amide group, and an imino group. The pigment derivative may have only one basic functional group or two or more basic functional groups.

Examples of the acidic functional group include a carboxy group and a sulfo group. The pigment derivative may have only one acidic functional group or two or more acidic functional groups.

The pigment derivative having an acidic functional group is preferably represented by Formula 3.

$$P-[R^{10}-X^{10}]m \qquad (3)$$

In Formula 3, P represents a colorant residue, $R^{10}$ represents a divalent linking group, and $X^{10}$ each independently represent a carboxy group or a sulfo group. m represents the maximum integer that can be substituted with P.

[P]

Examples of P include a diketopyrrolopyrrole-based colorant; an azo-based colorant such as azo, disazo, or polyazo; a phthalocyanine-based colorant; an anthraquinone-based colorant such as diaminodianthraquinone, anthrapyrimidine, flavanthrone, anthanthrone, indanthrone, pyranthrone, or violanthrone; a quinacridone-based colorant; a dioxazine-based colorant; a perinone-based colorant; a perylene-based colorant; a thioindigo-based colorant; an isoindoline-based colorant; an isoindolinone-based colorant; a quinophthalone-based colorant; and residues of a threne-based colorant and a metal complex-based colorant.

As P, among the above, from the viewpoint of improving the readability and the readability after the passage of time, a diketopyrrolopyrrole-based colorant, a phthalocyanine-based colorant, an anthraquinone-based colorant, or a dioxazine-based colorant residue is preferable, and a diketopyrrolopyrrole-based colorant, a phthalocyanine-based colorant, or an anthraquinone-based colorant is more preferable.

$[R^{10}]$

Examples of $R^{10}$ include an alkylene group, an arylene group, a divalent group selected from the group consisting of —O—, —S—, —C=O—, —$NR^{30}$—, —$CONR^{30}$—, —$SO_2NR^{30}$, —$NR^{30}CO$—, and —$NR^{30}SO_2$—, a divalent group obtained by combining two or more of these, and a single bond. $R^{30}$ represents a hydrogen atom or an alkyl group.

Among the above, a single bond is preferable as $R^{10}$.

$[X^{10}]$ $X^{10}$ is preferably a sulfo group. A plurality of $X^{10}$'s may be the same as or different from each other. It is preferable that $X^{10}$'s be the same as each other.

[m]

m is preferably 1 to 10, more preferably 1 to 5, and even more preferably 1 to 3.

The ink may contain one pigment derivative or two or more pigment derivatives.

From the viewpoint of improving the readability and the readability after the passage of time, the content of the pigment derivative is preferably 0.005% by mass to 0.1% by mass with respect to the total amount of the ink.

From the viewpoint of improving the readability and the readability after the passage of time, the content of the pigment derivative with respect to the total amount of the near-infrared absorbing colorant represented by Formula 1 is preferably 0.12% by mass to 15% by mass, and more preferably 0.15% by mass to 12% by mass.

(Polymerization Initiator)

It is preferable that the ink according to the present disclosure contain a polymerization initiator. The ink may contain one polymerization initiator or two or more polymerization initiators. In a case where the ink according to the present disclosure contains a radically polymerizable compound as a polymerizable monomer, the polymerization initiator is preferably a radical polymerization initiator.

Examples of the radical polymerization initiator include an alkylphenone compound, an acylphosphine compound, an aromatic onium salt compound, an organic peroxide, a thio compound, a hexaarylbiimidazole compound, a ketoxime ester compound, a borate compound, an azinium compound, a metallocene compound, an active ester compound, a carbon halogen bond-containing compound, and an alkylamine compound.

As the polymerization initiator, among the above, at least one compound selected from the group consisting of an acylphosphine compound and a thio compound is preferable, and at least one compound selected from the group consisting of an acylphosphine oxide compound and a thioxanthone compound is more preferable. It is even more preferable that the polymerization initiator contain an acylphosphine oxide compound and a thioxanthone compound.

In a case where the polymerization initiator contains an acylphosphine oxide compound and a thioxanthone compound, the readability after a transfer test and the readability after the rub test are improved.

Examples of the acylphosphine oxide compound include a monoacylphosphine oxide compound and a bisacylphosphine oxide compound. The acylphosphine oxide compound is preferably a bisacylphosphine oxide compound.

Examples of the monoacylphosphine oxide compound include isobutyryl diphenylphosphine oxide, 2-ethylhexanoyldiphenylphosphine oxide, 2,4,6-trimethylbenzoyldiphenylphosphine oxide, (2,4,6-trimethylbenzoyl)ethoxyphenylphosphine oxide, o-toluyldiphenylphosphine oxide, p-t-butylbenzoyldiphenylphosphine oxide, 3-pyridylcarbonyldiphenylphosphine oxide, acryloyl diphenylphosphine oxide, benzoyl diphenylphosphine oxide, pivaloyl phenylphosphinic acid vinyl ester, adipoyl bisdiphenylphosphine oxide, pivaloyl diphenylphosphine oxide, p-toluyldiphenylphosphine oxide, 4-(t-butyl) benzoyldiphenylphosphine oxide, terephthaloyl bisdiphenylphosphine oxide, 2-methylbenzoyldiphenylphosphine oxide, versatoyl diphenylphosphine oxide, 2-methyl-2-ethylhexanoyldiphenylphosphine oxide, 1-methyl-cyclohexanoyldiphenylphosphine oxide, pivaloyl phenylphosphinic acid methyl ester, and pivaloyl phenylphosphinic acid isopropyl ester.

Examples of the bisacylphosphine oxide compound include bis(2,6-dichlorobenzoyl)phenylphosphine oxide, bis(2,6-dichlorobenzoyl)-2,5-dimethylphenylphosphine oxide, bis(2,6-dichlorobenzoyl)-4-ethoxyphenylphosphine oxide, bis(2,6-dichlorobenzoyl)-4-propylphenylphosphine oxide, bis(2,6-dichlorobenzoyl)-2-naphthylphosphine oxide, bis(2,6-dichlorobenzoyl)-1-naphthylphosphine oxide, bis(2,6-dichlorobenzoyl)-4-chlorophenylphosphine oxide, bis(2,6-dichlorobenzoyl)-2,4-dimethoxyphenylphosphine oxide, bis(2,6-dichlorobenzoyl)decylphosphine oxide, bis(2,6-dichlorobenzoyl)-4-octylphenylphosphine oxide, bis(2,4,6-trimethylbenzoyl)phenylphosphine oxide, bis(2,4,6-trimethylbenzoyl)-2,5-dimethylphenylphosphine oxide, bis(2,6-dichloro-3,4,5-trimethoxybenzoyl)-2,5-dimethylphenylphosphine oxide, bis(2,6-dichloro-3,4,5-trimethoxybenzoyl)-4-ethoxyphenylphosphine oxide, bis(2-methyl-1-naphthoyl)-2,5-dimethylphenylphosphine oxide, bis(2-methyl-1-naphthoyl)-4-ethoxyphenylphosphine oxide, bis(2-methyl-1-naphthoyl)-2-naphthylphosphine oxide, bis(2-methyl-1-naphthoyl)-4-propylphenylphosphine oxide, bis(2-methyl-1-naphthoyl)-2,5-dimethylphenylphosphine oxide, bis(2-methoxy-1-naphthoyl)-4-ethoxyphenylphosphine oxide, bis(2-chloro-1-naphthoyl)-2,5-dimethylphenylphosphine oxide, and bis(2,6-dimethoxybenzoyl)-2,4,4-trimethylpentylphosphine oxide.

As the acylphosphine oxide compound, among the above, bis(2,4,6-trimethylbenzoyl)phenylphosphine oxide (trade name "Omnirad 819", manufactured by IGM Resins B.V.), 2,4,6-trimethylbenzoyldiphenylphosphine oxide (trade name "Omnirad TPO H", manufactured by IGM Resins B.V.), or (2,4,6-trimethylbenzoyl)ethoxyphenylphosphine oxide (trade name "Omnirad TPO-L", manufactured by IGM Resins B.V.) is preferable.

Examples of the thioxanthone compound include thioxanthone, 2-isopropylthioxanthone, 4-isopropylthioxanthone, 2-chlorothioxanthone, 2,4-dichlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl) thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy)ethoxycarbonyl] thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl)thioxanthone, 2-morpholinomethylthioxanthone, 2-methyl-6-morpholinomethylthioxanthone, n-allylthioxanthone-3,4-dicarboximide, n-octylthioxanthone-3,4-dicarboximi de, N-(1,1,3,3-tetramethylbutyl)thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester, and 2-hydroxy-3-(3, 4-dimethyl-9-oxo-9H-thioxanthon-2-yloxy)-N,N,N-trimethyl-1-propanaminium chloride.

The thioxanthone compound may be a commercially available product. Examples of the commercially available product include a SPEEDCURE series (examples: SPEEDCURE 7010, SPEEDCURE CPTX, SPEEDCURE ITX, and the like) manufactured by Lambson Limited.

In a case where the polymerization initiator contains an acylphosphine oxide compound and a thioxanthone compound, the ratio of the content of the acylphosphine oxide compound to the content of the thioxanthone compound is preferably 2 to 10, and more preferably 3 to 7, based on mass.

From the viewpoint of improving the readability and the readability after the passage of time, the content of the polymerization initiator with respect to the total amount of the ink is preferably 5% by mass or more, and more preferably 10% by mass or more. The upper limit of the content of the polymerization initiator is not particularly limited, but is, for example, 30% by mass.

In a case where the polymerization initiator contains an acylphosphine oxide compound, from the viewpoint of improving the readability and improving the readability after the passage of time, the content of the acylphosphine oxide compound with respect to the total amount of the ink is preferably 5% by mass to 15% by mass, and more preferably 8% by mass to 12% by mass.

In a case where the polymerization initiator contains a thioxanthone compound, the from the viewpoint of improving the readability after a transfer test and improving the readability after a rub test, the content of the thioxanthone compound with respect to the total amount of the ink is preferably 0.5% by mass to 5% by mass, and more preferably 1% by mass to 3% by mass.

The ink according to the present disclosure may further contain the following other components.

(Siloxane Compound)

It is preferable that the ink according to the present disclosure contain at least one siloxane compound. The siloxane compound acts as a surfactant in the ink. In a case where the ink contains the siloxane compound, the siloxane compound tends to be unevenly distributed near the interface between an ink film and air during curing of the ink. Accordingly, the readability after a rub test is improved.

The siloxane compound is preferably a modified organopolysiloxane. The modified organopolysiloxane refers to a polysiloxane obtained by introducing an organic group into some of methyl groups of polydimethylsiloxane. The position where the organic group is introduced may be a terminal or side chain of the polydimethylsiloxane.

Examples of the modified organopolysiloxane include polyether-modified polydimethylsiloxane, phenyl-modified polydimethylsiloxane, alcohol-modified polydimethylsiloxane, alkyl-modified polydimethylsiloxane, aralkyl-modified polydimethylsiloxane, fatty acid ester-modified polydimethylsiloxane, epoxy-modified polydimethylsiloxane, amine-modified polydimethylsiloxane, amino-modified polydimethylsiloxane, and mercapto-modified polydimethylsiloxane.

It is preferable that the siloxane compound contain a siloxane compound having a polymerizable group. In a case where the ink contains a siloxane compound having a polymerizable group as described above, the siloxane compound having a polymerizable group tends to be unevenly distributed near the interface between an ink film and air during curing of the ink. Polymerization is facilitated near the interface between the ink film and air, which improves the readability after an adhesion test and the readability after a transfer test.

The siloxane compound having a polymerizable group has a molecular weight of 1,000 or more and is distinguished from a polymerizable monomer.

In the siloxane compound having a polymerizable group, the number of polymerizable groups of the siloxane compound is not particularly limited and is, for example, 1 to 5. It is preferable that the type of polymerizable group of the siloxane compound be the same as the type of polymerizable group of the polymerizable monomers contained in the ink. Specifically, the polymerizable group is preferably a radically polymerizable group, more preferably an ethylenically unsaturated group, and even more preferably a (meth)acryloyl group.

The siloxane compound having a polymerizable group is preferably a polymerizable group-containing modified organopolysiloxane into which an organic group is introduced.

The siloxane compound having a polymerizable group may be a commercially available product. Examples of the commercially available product include TEGORAD 2100 manufactured by Evonik Industries AG, and the like.

In a case where the ink according to the present disclosure contains a siloxane compound, the content of the siloxane compound with respect to the total amount of the ink is preferably 0.01% by mass to 5% by mass, more preferably 0.05% by mass to 3% by mass, and even more preferably 0.05% by mass to 1.5% by mass. Particularly, the content of the siloxane compound having a polymerizable group with respect to the total amount of the ink is preferably 0.1% by mass to 5% by mass, and more preferably 0.5% by mass to 3% by mass. In a case where the content of the siloxane compound is 5% by mass or less, foaming is unlikely to occur during jetting of the ink, and excellent jettability is obtained. As a result, an article with a recorded image having excellent readability is obtained. On the other hand, in a case where the content of the siloxane compound is 0.1% by mass or more, polymerization near the interface between the ink film and the air is facilitated, which improves the readability after an adhesion test and improves the readability after a transfer test.

(Polymerization Inhibitor)

It is preferable that the ink according to the present disclosure contain a polymerization inhibitor. The ink may contain one polymerization inhibitor or two or more polymerization inhibitors.

Examples of the polymerization inhibitor include a hydroquinone compound, phenothiazine, catechols, alkylphenols, alkylbisphenols, zinc dimethyldithiocarbamate, copper dimethyldithiocarbamate, copper dibutyldithiocarbamate, copper salicylate, a thiodipropionic acid ester, mercaptobenzimidazole, phosphites, a nitrosamine compound, a hindered amine compound, and a nitroxyl radical.

As the polymerization inhibitor, among the above, at least one compound selected from the group consisting of a nitrosamine compound, a hindered amine compound, a hydroquinone compound, and a nitroxyl radical is preferable, and at least one compound selected from the group consisting of a nitrosamine compound, a hydroquinone compound, and a nitroxyl radical is more preferable. It is even more preferable that the polymerization inhibitor include a nitrosamine compound, a hydroquinone compound, and a nitroxyl radical.

Examples of the nitrosamine compound include a N-nitroso-N-phenylhydroxylamine aluminum salt and N-nitroso-N-phenylhydroxylamine. As the nitrosamine compound, among these, a N-nitroso-N-phenylhydroxylamine aluminum salt is preferable.

The hindered amine compound is a compound having a hindered amine structure in the molecule. Examples of the hindered amine compound include the compounds described in JP1986-91257A (JP-S61-91257A). As the hindered amine compound, among these, a derivative of 2,2,6,6-tetramethylpiperidine is preferable which has a structure established by the substitution of all hydrogens on carbons at 2- and 6-positions of piperidine with methyl groups. Examples of the hindered amine compound include 4-benzoyloxy-2,2,6, 6-tetramethylpiperidine and 1-(3,5-di-tert-butyl-4-hydroxyphenylpropionyloxyethyl)-4-(3,5-di-tert-butyl-4-hydroxyphenylpropionyloxy)-2,2,6,6-tetramethylpiperidine.

Examples of the hydroquinone compound include hydroquinone, methylhydroquinone, t-butylhydroquinone, and p-methoxyphenol. As the hydroquinone compound, among these, p-methoxyphenol is preferable.

Examples of the nitroxyl radical include 2,2,6,6-tetramethylpiperidine-1-oxyl (TEMPO) and 2,2,6,6-tetramethyl-4-hydroxypiperidine-1-oxyl (TEMPOL). As the nitroxyl radical, among these, 2,2,6,6-tetramethyl-4-hydroxypiperidine-1-oxyl (TEMPOL) is preferable.

From the viewpoint of improving temporal stability of the ink, the content of the polymerization inhibitor with respect to the total amount of the ink is preferably 1% by mass or more, and more preferably 1.5% by mass or more. The upper limit of the content of the polymerization inhibitor is not particularly limited, but is preferably 5% by mass from the viewpoint of polymerization properties.

In a case where the polymerization inhibitor includes a nitrosamine compound, from the viewpoint of improving temporal stability of the ink, the content of the nitrosamine compound with respect to the total amount of the ink is preferably 0.5% by mass to 5% by mass, and more preferably 0.5% by mass to 2% by mass.

In a case where the polymerization inhibitor includes a hydroquinone compound, from the viewpoint of improving temporal stability of the ink, the content of the hydroquinone compound with respect to the total amount of the ink is preferably 0.1% by mass to 5% by mass, and more preferably 0.5% by mass to 2% by mass.

(Sensitizer)

In a case where the ink according to the present disclosure contains a photopolymerization initiator, the ink may contain a sensitizer together with the photopolymerization initiator. In a case where the ink contains a sensitizer, curing properties are improved. Particularly, in a case where an LED light source is used, curing properties are improved. The sensitizer also contributes to the improvement of light resistance of the ink.

A sensitizer is a substance that is electronically excited by absorbing specific active energy rays. The electronically excited sensitizer comes into contact with the photopolymerization initiator and causes actions such as electron migration, energy transfer, and heat generation. As a result, the chemical change of the photopolymerization initiator is facilitated.

Examples of the sensitizer include ethyl 4-(dimethylamino)benzoate (EDB), anthraquinone, a 3-acylcoumarin derivative, terphenyl, styryl ketone, 3-(aroylmethylene)thiazoline, camphorquinone, eosin, rhodamine, erythrosine, a compound represented by General Formula (i) described in JP2010-24276A, and a compound represented by General Formula (I) described in JP1994-107718A (JP-H06-107718A).

In a case where the ink contains a sensitizer, the content of the sensitizer with respect to the total amount of the ink is preferably 1.0% by mass to 15.0% by mass, more preferably 1.5% by mass to 10.0% by mass, and even more preferably 2.0% by mass to 6.0% by mass.

The ink according to the present disclosure may contain at least one organic solvent.

Examples of the organic solvent include ketones such as acetone, methyl ethyl ketone, and diethyl ketone; alcohols such as methanol, ethanol, 2-propanol, 1-propanol, 1-butanol, and tert-butanol; chlorine-based solvents such as chloroform and methylene chloride; aromatic solvents such as benzene and toluene; ester-based solvents such as ethyl acetate, butyl acetate, isopropyl acetate, ethyl lactate, butyl lactate, and isopropyl lactate; ether-based solvents such as diethyl ether, tetrahydrofuran, and dioxane; glycol ether-based solvents such as ethylene glycol monomethyl ether, ethylene glycol dimethyl ether, and propylene glycol monomethyl ether; and glycol ether acetate-based solvents such as propylene glycol monomethyl ether acetate.

In a case where the ink according to the present disclosure contains an organic solvent, the content of the organic solvent with respect to the total amount of the ink is preferably 5% by mass or less, and more preferably 2% by mass or less. The ink according to the present disclosure may have a composition that does not contain an organic solvent (that is, the content of the organic solvent may be 0% by mass with respect to the total amount of the ink).

The ink according to the present disclosure may further contain additives such as a surfactant other than a siloxane compound, ultraviolet absorber, a co-sensitizer, an antioxidant, an antifading agent, and a conductive salt. For the additives, known publications such as JP2011-225848A and JP2009-209352A can be appropriately referred to.

<Physical Properties>

The viscosity of the ink according to the present disclosure is preferably 10 mPa·s to 50 mPa·s, more preferably 10 mPa·s to 30 mPa·s, and even more preferably 10 mPa·s to 25 mPa·s. The viscosity is a value measured at 25° C. using a viscometer. The viscosity is measured, for example, using a VISCOMETER TV-22 type viscometer (manufactured by TOKI SANGYO CO., LTD.).

The surface tension of the ink according to the present disclosure is preferably 20 mN/m to 45 mN/m, and more preferably 23 mN/m to 30 mN/m. The surface tension is a value measured at 25° C. using a surface tensiomter. The surface tension is measured using, for example, DY-700 (manufactured by Kyowa Interface Science Co., Ltd.).

[Ink Jet Recording Method]

The ink jet recording method according to the present disclosure includes a step of jetting the ink according to the present disclosure to a substrate by an ink jet recording method (hereinafter, also called "ink jetting step") and a step of irradiating the ink jetted onto the substrate with an active energy ray (hereinafter, also called "active energy ray-irradiating step).

(Ink Jetting Step)

In the ink jet recording method of the present disclosure, first, the ink according to the present disclosure is jetted to a substrate by an ink jet recording method.

[Substrate]

The substrate is not particularly limited as long as an ink image can be formed thereon. Examples of the substrate include paper, cloth, wood, metals, and plastics.

Examples of the paper include general printing paper mainly composed of cellulose, such as high-quality paper, coated paper, and art paper, and ink jet recording paper. The paper may include an oil-based varnish or a water-based varnish applied thereon.

The substrate may be a permeable substrate or an impermeable substrate. "Impermeable" means that the substrate absorbs little or does not absorb the water contained in the ink, which specifically means the properties in which the amount of water that the substrate absorbs is 10.0 g/m$^2$ or less.

In the ink jet recording method according to the present disclosure, particularly in a case where an impermeable substrate is used as a substrate, an image having excellent curing properties can be obtained.

The shape of the impermeable substrate is not particularly limited, and may be a three-dimensional shape such as a bottle, a sheet shape, or a film shape.

Examples of the impermeable substrate include metals (for example, aluminum), plastics (for example, polyvinyl chloride, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal), and glass.

It is preferable that the impermeable substrate include a thermoplastic resin such as polyvinyl chloride, polyethylene terephthalate, or polypropylene among the above.

The impermeable substrate may have undergone a surface treatment.

Examples of the surface treatment include a corona treatment, a plasma treatment, a heat treatment, an abrasion treatment, a light irradiation treatment (for example, an ultraviolet irradiation treatment), and a flame treatment.

The corona treatment can be performed using, for example, CORONA MASTER (PS-10S, manufactured by Shinko Electric & Instrumentation Co., Ltd.). The conditions for the corona treatment may be appropriately selected according to the type of the impermeable substrate, the composition of the ink, and the like. The corona treatment can be performed, for example, under the following conditions.

Treatment voltage: 10 to 15.6 kV
Treatment speed: 30 to 100 mm/s

The substrate may also be a transparent substrate or a substrate processed by polyethylene or polypropylene lamination.

Examples of the transparent substrate include glass, quartz, and plastics (for example, cellulose diacetate, cellulose triacetate, cellulose propionate, cellulose butyrate, cellulose acetate butyrate, cellulose nitrate, an acrylic resin, a chlorinated polyolefin resin, a polyether sulfone resin, polyethylene terephthalate (PET), polyethylene naphthalate, nylon, polyethylene, polystyrene, polypropylene, a polycycloolefin resin, a polyimide resin, a polycarbonate resin, polyvinyl acetal, and the like). The transparent substrate may be composed of one layer or two or more layers.

[Ink Jet Recording Method]

The ink jet recording method is not particularly limited as long as it is a method capable of recording an image. The ink jet recording method may be any of known methods, for example, an electric charge control method of jetting an ink by using electrostatic attraction force, a drop-on-demand method using the vibration pressure of a piezo element (pressure pulse method), an acoustic ink jet method of jetting an ink by using radiation pressure by means of converting electric signals into acoustic beams and irradiating the ink with the acoustic beams, and a thermal ink jet (Bubble Jet (registered trademark)) method of forming air bubbles by heating an ink and using the generated pressure.

As the ink jet recording method, particularly, it is possible to effectively use the method described in JP1979-59936A (JP-S54-59936A), which is an ink jet recording method of causing an ink to experience a rapid volume change by the action of thermal energy and jetting the ink from a nozzle by using the acting force resulting from the change of state.

Regarding the ink jet recording method, the method described in paragraphs "0093" to "0105" of JP2003-306623A can also be referred to.

Examples of ink jet heads used in the ink jet recording method include ink jet heads for a multi-pass method of using short serial heads that are caused to scan a substrate in a width direction of the substrate to perform recording and ink jet heads for a single-pass method of using line heads that each consist of recording elements arranged for the entire area of each side of a substrate.

In the single-pass method, by causing the substrate to be scanned in a direction intersecting with the arrangement direction of the recording elements, a pattern can be formed on the entire surface of the substrate. Therefore, this method does not require a transport system such as a carriage that transports short heads for scanning. Furthermore, in the single-pass method, complicated scanning control for moving a carriage and a substrate is not necessary, and only a substrate moves. Therefore, the recording speed can be further increased in the single-pass method than in the multi-pass method. Accordingly, in the ink jet recording method according to the present disclosure, it is preferable that the ink be jetted by the single-pass method.

The amount of ink jetted from the ink jet head is preferably 1 pL (picoliter) to 100 pL, more preferably 3 pL to 80 pL, and even more preferably 3 pL to 20 pL.

(Active Energy Ray-Irradiating Step)

In the ink jet recording method of the present disclosure, it is preferable that the ink jetted onto the substrate be irradiated with active energy rays. The polymerizable monomers in the ink are polymerized and cured by the irradiation with active energy rays. Examples of the active energy ray include α-rays, γ rays, X-rays, ultraviolet rays, visible rays, and electron beams. From the viewpoint of safety and costs, as the active energy rays, among the above, an ultraviolet ray (hereinafter, also called "UV") or a visible ray is preferable, and an ultraviolet ray is more preferable.

The exposure amount of the active energy ray is preferably 20 mJ/cm$^2$ to 10,000 J/cm$^2$, and more preferably 100 mJ/cm$^2$ to 7.000 mJ/cm$^2$. The irradiation time is preferably 0.01 seconds to 120 seconds, and more preferably 0.1 seconds to 90 seconds. As the irradiation conditions and the basic irradiation method, the irradiation method disclosed in JP1985-132767A (JP-S60-132767A) can be adopted. Specifically, it is preferable to use a method of providing a light source on both sides of a head unit including an ink jet device and scanning the substrate by the head unit and the light source by a so-called multi-pass method, or a method of irradiating the substrate with another light source that is not involved in driving.

As the light source for ultraviolet irradiation, a mercury lamp, a gas laser, and a solid-state laser are mainly used. A mercury lamp, a metal halide lamp, and an ultraviolet fluorescent lamp are widely known light sources. In addition, using a gallium nitride (GaN)-based semiconductor ultraviolet light emitting device as a substitute is industrially and environmentally extremely useful. Furthermore, a UV light emitting diode (LED) and a UV laser diode (LD) are promising light sources for ultraviolet irradiation because these are compact, have long service life and high efficiency, and inexpensive. As the light source for ultraviolet irradiation, among these, a metal halide lamp, a high-pressure mercury lamp, a medium-pressure mercury lamp, a low-pressure mercury lamp, or UV-LED is preferable.

Examples of UV-LED include a purple LED (manufactured by NICHIA CORPORATION) having a main emission spectrum at a wavelength between 365 nm and 420 nm. U.S. Pat. No. 6,084,250B discloses, as LED having a shorter wavelength, LED that can emit an ultraviolet ray having a wavelength between 300 nm and 370 nm. Furthermore, combining several UV-LEDs makes it possible to radiate an ultraviolet ray in different wavelength ranges. The peak wavelength of the ultraviolet ray is, for example, preferably 200 nm to 405 nm, more preferably 220 nm to 400 nm, and even more preferably 340 nm to 400 nm.

In a case where active energy ray irradiation is performed in an atmosphere with an oxygen concentration of 1% by volume or less after the ink jetting step, it is possible to inhibit oxygen from hindering polymerization and to improve curing properties. The lower limit of the oxygen concentration is not particularly limited. By making a vacuum state or substituting the irradiation atmosphere with a gas (for example, nitrogen) other than the air, it is possible to make the oxygen concentration substantially zero. The oxygen concentration in the active energy ray-irradiating step is preferably 0.01% by volume to 1% by volume, and more preferably 0.1% by volume to 1% by volume.

Examples of means for controlling the oxygen concentration of the irradiation atmosphere include a method of making the ink jet recording device a closed system and creating a nitrogen atmosphere or a carbon dioxide atmosphere, and a method of letting an inert gas such as nitrogen to flow. Examples of nitrogen supplying methods include a method of using a nitrogen gas cylinder, and a method of using a device separating only a nitrogen gas from the air by exploiting the difference between permeability of oxygen to a hollow fiber membrane and permeability of nitrogen to a hollow fiber membrane. Examples of carbon dioxide supplying methods include a method of using a carbon dioxide gas cylinder. The inert gas refers to a general gas such as $N_2$, $H_2$, or $CO_2$, and a rare gas such as He, Ne, or Ar. From the viewpoint of safety, ease of availability, and costs, among the above, $N_2$ is preferable as the inert gas.

The active energy ray-irradiating step may include a step of irradiating the ink jetted onto the substrate with a first active energy ray to semi-cure the ink film (that is, the film formed of the ink applied to the substrate) (hereinafter, this step will be called "first irradiating step") and a step of irradiating the semi-cured ink film with a second active energy ray to fully cure the ink film (hereinafter, this step will be called "second irradiating step").

In a case where the step of semi-curing the ink film is cured and then the step of fully curing the ink film is performed, the readability after a rub test and the readability after an adhesion test are improved.

In the present disclosure, polymerization of only some of the polymerizable monomers in the ink film is called "semi-curing", and the active energy ray irradiation for semi-curing is also called "pinning exposure". In the present disclosure, polymerization of substantially all the polymerizable monomers in the ink film is called "full curing", and the active energy ray irradiation for full curing is also called "main exposure".

In the first irradiating step, by the irradiation of the ink film with the first active energy ray, at least some of the polymerizable monomers in the ink film are polymerized. In the second irradiating step, by the irradiation of the ink film with the second active energy ray, substantially all of the polymerizable monomers in the ink film are polymerized.

In the first irradiating step, in order to polymerize only some of the polymerizable monomers in the ink film, the exposure amount of the active energy ray is set to be smaller, compared to a case where only the main exposure is performed.

The exposure amount of the first active energy ray is preferably 2 mJ/cm$^2$ to 5,000 mJ/cm$^2$, and more preferably 20 mJ/cm$^2$ to 5,000 mJ/cm$^2$. The irradiation time is preferably 0.01 seconds to 20 seconds, and more preferably 0.1 seconds to 10 seconds.

The exposure amount of the second active energy ray is preferably 20 mJ/cm$^2$ to 10,000 J/cm$^2$, and more preferably 100 mJ/cm$^2$ to 7,000 mJ/cm$^2$. The irradiation time is preferably 0.01 seconds to 120 seconds, and more preferably 0.1 seconds to 90 seconds.

The reaction rate of the ink film after the pinning exposure is preferably 10% to 80%.

The reaction rate of the ink film after the main exposure is preferably more than 80% and 100% or less, more preferably 85% to 100%, and even more preferably 90% to 100%.

The reaction rate of the ink film means the polymerization rate of the polymerizable monomers in the ink film determined by high-performance liquid chromatography.

The reaction rate of the ink film is calculated using the following method.

A substrate having an ink film irradiated with an active energy ray is prepared. A sample piece having a size of 20 mm×50 mm is cut out from a region of the substrate where the ink film is present. The cut sample piece is immersed in 10 mL of tetrahydrofuran (THF) for 24 hours, thereby obtaining an eluate containing the eluted ink. High-performance liquid chromatography is performed on the obtained eluate to calculate the amount of the polymerizable monomers (hereinafter, called "amount X1 of monomers after irradiation").

The same operation as described above is performed, except that another substrate having an ink film not being irradiated with an active energy ray is prepared, and the amount of polymerizable monomers (hereinafter, called "amount X0 of monomers before irradiation") is calculated.

Based on the amount X1 of monomers after irradiation and the amount X0 of monomers before irradiation, the reaction rate (%) of the ink film is calculated by the following equation.

Reaction rate of ink (%)=((amount X0 of monomers before irradiation−amount X1 of monomers after irradiation)/amount X0 of monomers before irradiation)×100

In a case where the active energy ray-irradiating step includes the first irradiating step and the second irradiating step, the time taken for the ink to be irradiated with the first active energy ray after being landed on the substrate is preferably 0.5 seconds or less. In a case where the ink is semi-cured immediately after landing, the ink is inhibited from spreading on the substrate, and the readability is improved. There is no particular limit on the time taken for the ink to be irradiated with the second active energy ray after being landed on the substrate.

In a case where the semi-curing step is not included (that is, only the main curing step is performed), the time taken for the ink to be irradiated with an active energy ray after being landed on the substrate is preferably 1 second or less. In a case where the ink is fully cured immediately after landing, the ink is inhibited from spreading on the substrate, and the readability is improved.

(Other Steps)

The ink jet recording method according to the present disclosure may include other steps in addition to the ink jetting step and the active energy ray-irradiating step. Examples of those other steps include a drying step of drying the ink jetted onto the substrate after the ink jetting step. The drying means and the drying temperature in the drying step can be appropriately adjusted.

EXAMPLES

Hereinafter, examples of the present disclosure will be described, but the present disclosure is not limited to the following examples.

Details of each component contained in the inks of examples and comparative examples are as follows. Speedcure 7010L (manufactured by Lambson Limited) and FLORSTAB UV12 (manufactured by Kromachem Ltd) were used for preparing the inks. Speedcure 7010L is a mixture of Speedcure 7010 and EOTMPTA, and the mixing ratio is 1:1 based on mass. In the table, Speedcure 7010 is described in the column of "Polymerization initiator", and EOTMPTA is described in the column of "Polymerizable monomer". Furthermore, FLORSTAB UV12 is a mixture of a N-nitroso-N-phenylhydroxylamine aluminum salt and PEA, and the mixing ratio is 1:9. In the table, the N-nitroso-N-phenylhydroxylamine aluminum salt is described in the column of "Polymerization inhibitor", and PEA is described in the column of "Polymerizable monomer".

<Pigment>

Compound B-1 . . . squarylium dye

Compound B-3 . . . squarylium dye

Compound B-7 . . . squarylium dye

Compound B-37 . . . squarylium dye

Compound B-41 . . . squarylium dye

Compound B-43 . . . squarylium dye

Compound B-44 . . . squarylium dye

Compound P-1 . . . pyrrolopyrrole boron dye

The structural formula of each pigment is as follows. In the formula, "Ph" represents a phenyl group.

B-1
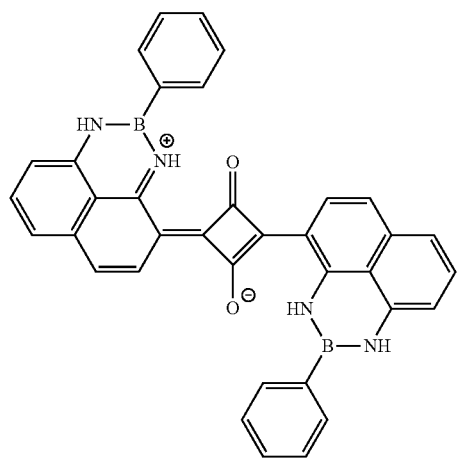
B-3
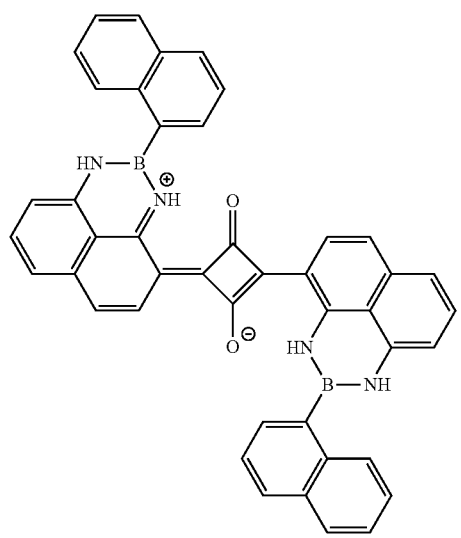
B-7
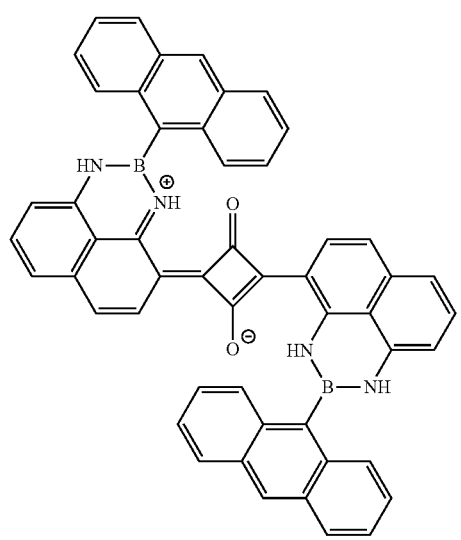
B-37
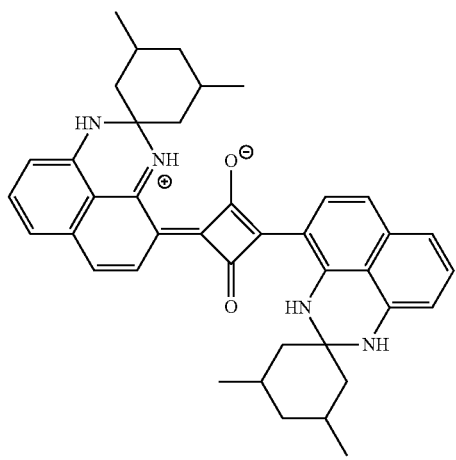
B-41
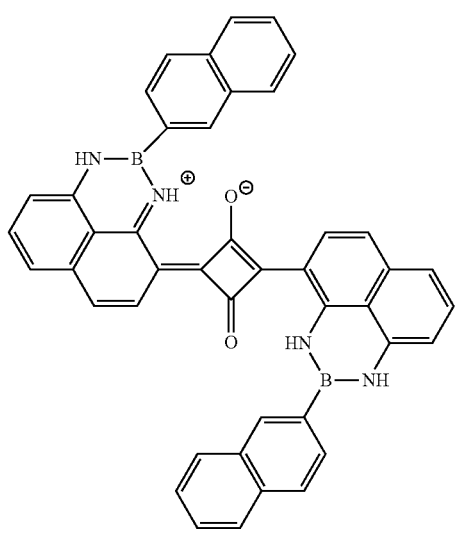
B-43
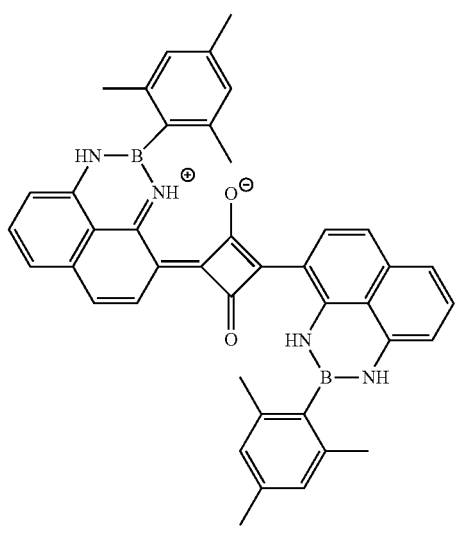

B-44

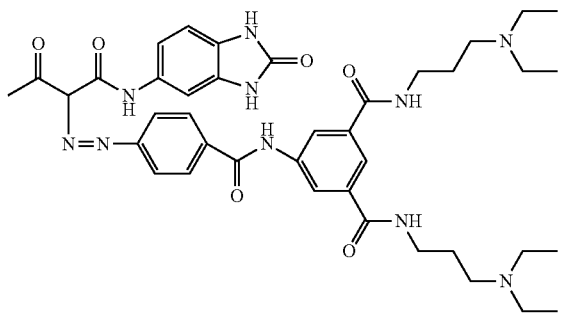

P-1

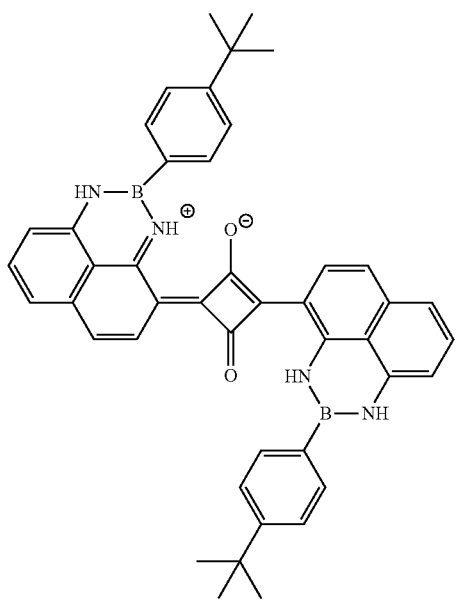

<Pigment Derivative>

Pigment derivative 1 having acidic functional group . . . SOLSPERSE 5000S (manufactured by Lubrizol Japan Limited), copper phthalocyanine having sulfo group Pigment derivative 2 having acidic functional group . . . SOLSPERSE 12000S (manufactured by Lubrizol Japan Limited), copper phthalocyanine having sulfo group Pigment derivative having basic functional group . . . the following compound S-1

S-1

<Dispersant>

Graft polymer 1 having acidic functional group . . . trade name "SOLSPERSE 55000" (manufactured by Lubrizol Japan Limited), weight-average molecular weight: 55,000, SP value: 21.65 MPa$^{1/2}$ Graft polymer 2 having acidic functional group . . . trade name "SOLSPERSE 41000" (manufactured by Lubrizol Japan Limited), weight-average molecular weight: 47,000, SP value: 30.99 MPa$^{1/2}$ Graft polymer 1 having basic functional group . . . trade name "SOLSPERSE 32000" (manufactured by Lubrizol Japan Limited), weight-average molecular weight: 59,000, SP value: 18.62 MPa$^{1/2}$ Graft polymer 2 having basic functional group . . . trade name "EFKA PX 4731" (manufactured by BASF SE), weight-average molecular weight: 24,000, SP value: 20.10 MPa$^{1/2}$ Graft polymer 3 having basic functional group . . . trade name "SOLSPERSE 71000" (manufactured by Lubrizol Japan Limited), weight-average molecular weight: 52,890, SP value: 21.74 MPa$^{1/2}$ Graft polymer 4 having basic functional group . . . trade name "BYKJET-9151" (manufactured by BYK-Chemie GmbH.), weight-average molecular weight: 22,810, SP value: 25.89 MPa$^{1/2}$ Block polymer 1 having basic functional group . . . trade name "EFKA PX 4701" (manufactured by BASF SE), weight-average molecular weight: 22,000, SP value: 32.73 MPa$^{1/2}$ Block polymer 2 having basic functional group . . . trade name "DISPERBYK 191" (manufactured by BYK-Chemie GmbH.), weight-average molecular weight: 12,000, SP value: 33.55 MPa$^{1/2}$ Block polymer 3 having acidic functional group . . . trade name "DISPERBYK-2001" (manufactured by BYK-Chemie GmbH.), weight-average molecular weight: 3,500, SP value: 22.68 MPa$^{1/2}$ The SP value of the dispersant was calculated using the following K. W. SUH, J. M. CORBETT's equation (Journal of Applied Polymer Science, 12, 2359, 1968).

$$SP\ value = \{(V_{ml})^{1/2} \times \delta H + (V_{mh})^{1/2} \times \delta D\} / \{(V_{ml})^{1/2} + (V_{mh})^{1/2}\}$$

$V_{ml}$, $V_{mh}$, $\delta H$, and $\delta D$ are calculated by adding n-hexane at a measurement temperature of 20° C. to a solution obtained by dissolving 0.5 g (solid content) of the dispersant in 10 mL of acetone, denoting a titer at a turbid point caused by the addition of n-hexane by H (mL), adding deionized water at a measurement temperature of 20° C. to a solution obtained by dissolving 0.5 g (solid content) of the dispersant in 10 mL of acetone, denoting a titer at a turbid point caused by the addition of deionized water by D (mL), and plugging H and D into the following equations.

$$V_{mf}=74.4\times130.3/\{(1-V_H)\times130.3+V_H\times74.4\}$$

$$V_{mh}=74.4\times18/\{(1-V_D)\times18+V_D\times74.4\}$$

$$V_H=H/(10+H)$$

$$V_D=D/(10+D)$$

$$\delta H=9.72\times10/(10+H)+7.27\times H/(10+H)$$

$$\delta D=9.72\times10/(10+D)+23.39\times D/(10+D)$$

SP values of acetone, hexane, and deionized water were calculated using HSPiP (version 4.1.07) software.

The unit of the obtained SP values is $(cal/cm^3)^{1/2}$. The unit was converted into $MPa^{1/2}$ from $(cal/cm^3)^{1/2}$, based on 1 $(cal/cm^3)\approx2.05\ MPa^{1/2}$.

<<Polymerizable Monomer>>

MPDDA . . . trade name "SR341" (manufactured by Sartomer), 3-methyl-1,5-pentanediol diacrylate, SP value: $17.60\ MPa^{1/2}$, Tg: 105° C.

DPGDA . . . trade name "DPGDA" (manufactured by DAICEL-ALLNEX LTD.), dipropylene glycol diacrylate, SP value: $17.73\ MPa^{1/2}$, Tg: 104° C.

IBOA . . . trade name "SR506NS" (manufactured by Sartomer), isobornyl acrylate, SP value: $17.10\ MPa^{1/2}$, Tg: 97° C.

TCDDMDA . . . trade name "SR833S" (manufactured by Sartomer), tricyclodecane dimethanol diacrylate, SP value: $17.85\ MPa^{1/2}$, Tg: 186° C.

TMPTA . . . trade name "TMPTA" (manufactured by DAICEL-ALLNEX LTD.), trimethylolpropantriacrylate, SP value: $17.43\ MPa^{1/2}$, Tg: 27° C.

ACMO . . . trade name "ACMO" (manufactured by RAHN AG), acryloylmorpholine, SP value: $22.39\ MPa^{1/2}$, Tg: 145° C.

EOTMPTA . . . EO-added trimethylolpropane triacrylate, SP value: $17.72\ MPa^{1/2}$, taking up 50% by mass of Speedcure 7010L (manufactured by Lambson Limited), Tg: 90° C.

PEA . . . phenoxyethyl acrylate, SP value: $19.44\ MPa^{1/2}$, taking up 90% by mass of FLORSTAB UV12 (manufactured by Kromachem Ltd), Tg: 5° C.

As the glass transition temperature (Tg) of each polymerizable monomer, Tg that each polymerizable monomer has in a state of being made into a homopolymer having a weight-average molecular weight of 10,000 to 20,000 was adopted. The glass transition temperature (Tg) is a value measured using a differential scanning calorimeter (trade name "EXSTAR6220") manufactured by SII NanoTechnology Inc.

The SP value of the polymerizable monomers was calculated based on the following Equation A and Equations B1 to B3. The dispersion element, polarity element, and hydrogen bond element of each polymerizable monomer contained in the ink are as shown in Table 1. The dispersion element $\delta d$, the polarity element $\delta p$, and the hydrogen bond element $\delta h$ are values calculated using HSPiP (version 4.1.07) software.

$$SP\ value\ (\delta)\ [MPa^{1/2}]=(\delta d^2+\delta p^2+\delta h^2)^{1/2} \quad (A)$$

$$\delta d=\Sigma\delta d_m W_m/\Sigma W_m \quad (B1)$$

$$\delta p=\Sigma\delta p_m W_m/\Sigma W_m \quad (B2)$$

$$\delta h=\Sigma\delta h_m W_m/\Sigma W_m \quad (B3)$$

In Equation B1, $\delta d_m$ represents a dispersion element of the mth polymerizable monomer (m represents an integer of 1 or more) in the polymerizable monomers.

In Equation B2, $\delta p_m$ represents a polarity element of the mth polymerizable monomer (m represents an integer of 1 or more) in the polymerizable monomers.

In Equation B3, $\delta h_m$ represents a hydrogen bond element of the mth polymerizable monomer (m represents an integer of 1 or more) in the polymerizable monomers.

In Equations B1 to B3, $W_m$ represents the ratio of the content (% by mass) of the mth polymerizable monomer to the total amount of the polymerizable monomers.

Tables 2 to 6 show the calculated SP values of the polymerizable monomers.

<Polymerization Initiator>

Omnirad 819 (manufactured by IGM Resins B.V.): Bis(2,4,6-trimethylbenzoyl)phenylphosphine oxide Omnirad TPO-L (manufactured by IGM Resins B.V.): (2,4,6-Trimethylbenzoyl)ethoxyphenylphosphine oxide Speedcure 7010: 1,3-di({α-[1-chloro-9-oxo-9H-thioxanthen-4-yl)oxy]acetylpoly[oxy(1-methylethylene)]}oxy)-2,2-bis({α-[1-methylethylene)]}oxymethyl)propane, taking up 50% by mass of Speedcure 7010L (manufactured by Lambson Limited)

<Siloxane Compound>

BYK-307 (manufactured by BYK-Chemie GmbH.): polysiloxane having no polymerizable group TEGORAD 2100 (manufactured by Evonik Degussa): polysiloxane having polymerizable group <Polymerization Inhibitor>

N-nitroso-N-phenylhydroxylamine aluminum salt: taking up 10% by mass of FLORSTAB UV12 (manufactured by Kromachem Ltd)

MEHQ: p-Methoxyphenol

Example 7

The components were mixed together to obtain the following composition, and subjected to pre-dispersion for 30 minutes using a stirrer. Then, a dispersion treatment using a batch-type beads mill (trade name "EASY NANO RMB", manufactured by AIMEX CO., Ltd.) and zirconia beads having a diameter of 0.5 mmφ was performed on the mixture at 1,000 rpm (rotation speed/min) for 4.5 hours. The mixture was filtered using a 67 μm filter cloth and a 5 μm filter, thereby obtaining a dispersion A1.

<Composition>

Compound B-1 . . . 4% by mass

Pigment derivative 1 having acidic functional group . . . 0.02% by mass

Block polymer 1 having basic functional group . . . 4% by mass

MPDDA . . . 91.98% by mass

Next, the components were mixed together to obtain the following composition, thereby preparing an ink.

<Composition>

The above dispersion A1 . . . 25% by mass

DPGDA . . . 25% by mass

IBOA . . . 12% by mass

TCDDMDA . . . 17% by mass

TMPTA . . . 5% by mass

PEA . . . 4% by mass

Omnirad 819 . . . 4% by mass

TPO-L . . . 6% by mass

FLORSTAB UV12 . . . 1% by mass

MEHQ . . . 1% by mass

Examples 1 to 6 and 8 to 25 and Comparative Examples 1 to 6

Dispersions and inks were prepared by the same method as the method in Example 7, except that the content of each of the components contained in each ink was changed to the content (% by mass) described in Tables 2 to 5.

<Image Recording>

Each of the inks prepared in examples and comparative examples was filtered using a 5 μm filter. The ink cartridge attached to an ink jet recording device (trade name "DMP-2850", manufactured by FUJIFILM Corporation) was filled with the filtrate, and a 3% halftone dot image was recorded on a substrate under the conditions of a nozzle temperature of 25° C., a resolution of 600 dpi (dots per inch), and a jetting amount of 10 pL. A polyethylene terephthalate (PET) film was used as a substrate. Then, by using an LED lamp (trade name "PEL UV CURE UNIT", manufactured by PRINTED ELECTRONICS LTD), the substrate was irradiated with an ultraviolet ray (wavelength 395 nm) in an exposure amount of 250 mW/cm$^2$, thereby obtaining an article with a recorded image.

By using each of the inks prepared in examples and comparative examples, the readability, the readability after the passage of time, the readability after a transfer test, the readability after an adhesion test, and the readability after a rub test were evaluated. The evaluation results are shown in Tables 2 to 5. In Tables 2 to 5, "Difference in SP value" means the calculated difference between the SP value of the polymerizable monomers and the SP value of the dispersant. In addition, "Proportion of monomer having Tg of 30° C. or higher" means the proportion of a polymerizable monomer having a glass transition temperature of 30° C. or higher in all the polymerizable monomers. In Comparative Example 6, the curing properties were insufficient, and the readability after a transfer test, the readability after an adhesion test, and the readability after a rub test could not be evaluated. Therefore, "-" is marked in Table 5 for Comparative Example 6.

[Readability]

Twenty sites were randomly selected from the obtained article with a recorded image, and whether or not the image is readable was determined using an IR detector. Based on the number of sites where the image was read, the readability was evaluated. The evaluation standard is as follows.
- A: The image was read at 15 to 20 sites.
- B: The image was read at 10 to 14 sites.
- C: The image was read at 5 to 9 sites.
- D: The image was read at no site or the image was read at 1 to 4 sites.

[Readability After Passage of Time]

After the inks were prepared, the airtight container containing each ink was left to stand at 50° C. for 1 week. After 1 week, the ink was filtered using a 5 μm filter. The ink cartridge attached to an ink jet recording device (trade name "DMP-2850", manufactured by FUJIFILM Corporation) was filled with the filtrate, and an article with a recorded image was obtained by the same method as the image recording described above.

Twenty sites were randomly selected from the obtained article with a recorded image, and whether or not the image is readable was determined using an IR detector. Based on the number of sites where the image was read, the readability after the passage of time was evaluated. The evaluation standard is as follows.
- A: The image was read at 15 to 20 sites.
- B: The image was read at 10 to 14 sites.
- C: The image was read at 5 to 9 sites.
- D: The image was read at no site or the image was read at 1 to 4 sites.

[Readability After Transfer Test]

A photographic substrate (trade name: "Kassai Photofinishing Glossy Premium", manufactured by FUJIFILM Corporation) was superposed on the obtained article with a recorded image. The photographic substrate was pressed under a load of 5 N for 3 seconds. After the photographic substrate was peeled off, twenty sites were randomly selected from the obtained article with a recorded image, and whether or not the image is readable was determined using an IR detector. Based on the number of sites where the image was read, the readability after a transfer test was evaluated. The evaluation standard is as follows.
- A: The image was read at 15 to 20 sites.
- B: The image was read at 10 to 14 sites.
- C: The image was read at 5 to 9 sites.
- D: The image was read at no site or the image was read at 1 to 4 sites.

[Readability After Adhesion Test]

A pressure-sensitive surface of a tape (trade name "CT405AP-12", manufactured by NICHIBAN Co., Ltd.) was stuck to the obtained article with a recorded image. After the tape was peeled off, twenty sites were randomly selected from the obtained article with a recorded image, and whether or not the image is readable was determined using an IR detector. Based on the number of sites where the image was read, the readability after an adhesion test was evaluated. The evaluation standard is as follows.
- A: The image was read at 15 to 20 sites.
- B: The image was read at 10 to 14 sites.
- C: The image was read at no site or the image was read at 1 to 9 sites.

[Readability After Rub Test]

A fine cotton cloth was applied to rubbed 15 times on the obtained article with a recorded image under a load of 200 g. After the rub, twenty sites were randomly selected from the obtained article with a recorded image, and whether or not the image is readable was determined using an IR detector. Based on the number of sites where the image was read, the readability after an adhesion test was evaluated. The evaluation standard is as follows.
- A: The image was read at 15 to 20 sites.
- B: The image was read at 10 to 14 sites.
- C: The image was read at 5 to 9 sites.
- D: The image was read at no site or the image was read at 1 to 4 sites.

TABLE 2

| | | Molecular weight | Example 1 | Example 2 | Example 3 | Example 4 | Example 5 | Example 6 |
|---|---|---|---|---|---|---|---|---|
| Pigment | Compound B-1 | | 1 | — | 1 | — | 1 | — |
| | Compound B-37 | | — | 1 | — | 1 | — | 1 |
| Dispersant | Graft polymer 1 having acidic functional group (SP value: 21.65) | 55000 | — | 1 | — | — | — | — |

TABLE 2-continued

| | | Molecular weight | Example 1 | Example 2 | Example 3 | Example 4 | Example 5 | Example 6 |
|---|---|---|---|---|---|---|---|---|
| | Graft polymer 2 having acidic functional group (SP value: 30.99) | 47000 | — | — | — | 1 | — | — |
| | Graft polymer 3 having basic functional group (SP value: 21.74) | 52890 | 1 | — | — | — | — | — |
| | Graft polymer 4 having basic functional group (SP value: 25.89) | 22810 | — | — | 1 | — | — | — |
| | Block polymer 1 having basic functional group (SP value: 32.73) | 22000 | — | — | — | — | 1 | — |
| | Block polymer 1 having acidic functional group (SP value: 22.68) | 3500 | — | — | — | — | — | 1 |
| Polymerizable monomer | MPDDA | | 23 | 23 | 23 | 23 | 23 | 23 |
| | DPGDA | | 25 | 25 | 25 | 25 | 25 | 25 |
| | IBOA | | 12 | 12 | 12 | 12 | 12 | 12 |
| | TCDDMDA | | 17 | 17 | 17 | 17 | 17 | 17 |
| | TMPTA | | 5 | 5 | 5 | 5 | 5 | 5 |
| | PEA | | 4.9 | 4.9 | 4.9 | 4.9 | 4.9 | 4.9 |
| Polymerization initiator | Ominirad 819 | | 4 | 4 | 4 | 4 | 4 | 4 |
| | TPO-L | | 6 | 6 | 6 | 6 | 6 | 6 |
| Polymerization inhibitor | N-nitrose-N-phenyl hydroxylamine aluminum salt | | 0.1 | 0.1 | 0.1 | 0.1 | 0.1 | 0.1 |
| | MEHQ | | 1 | 1 | 1 | 1 | 1 | 1 |
| SP value of polymerizable monomer [MPa$^{1/2}$] | | | 17.7 | 17.7 | 17.7 | 17.7 | 17.7 | 17.7 |
| Difference in SP value [MPa$^{1/2}$] | | | 4.1 | 4.0 | 8.2 | 13.3 | 15.1 | 5.0 |
| Proportion of monomer having Tg of 30° C. or higher [% by mass] | | | 88.6 | 88.6 | 88.6 | 88.6 | 88.6 | 88.6 |
| Evaluation | Readability | | B | B | A | A | A | A |
| | Readability after passage of time | | C | C | C | C | B | B |
| | Readability after transfer test | | C | C | C | C | C | C |
| | Readability after adhesion test | | B | B | B | B | B | B |
| | Readability after rub test | | C | C | C | C | C | C |

TABLE 3

| | | Molecular weight | Example 7 | Example 8 | Example 9 | Example 10 | Example 11 | Example 12 |
|---|---|---|---|---|---|---|---|---|
| Pigment | Compound B-1 | | 1 | — | 1 | — | 1 | 1 |
| | Compound B-37 | | — | 1 | — | 1 | — | — |
| Pigment derivative | Pigment derivative 1 having acidic functional group | | 0.005 | — | 0.005 | — | 0.005 | 0.005 |
| | Pigment derivative having basic functional group | | — | 0.005 | — | 0.005 | — | — |
| Dispersant | Block polymer 1 having basic functional group (SP value: 32.73) | 22000 | 1 | — | 1 | — | 1 | 1 |
| | Block polymer 1 having acidic functional group (SP value: 22.68) | 3500 | — | 1 | — | 1 | — | — |
| Polymerizable monomer | MPDDA | | 22.995 | 22.995 | 22.995 | 22.995 | 22.995 | 22.995 |
| | DPGDA | | 25 | 25 | 25 | 25 | 25 | 25 |
| | IBOA | | 12 | 12 | 12 | 12 | 12 | 10 |
| | TCDDMDA | | 17 | 17 | 16 | 16 | 16.7 | 14 |
| | TMPTA | | 5 | 5 | 5 | 5 | 5 | 5 |
| | EOTMPTA | | — | — | — | — | — | — |
| | PEA | | 4.9 | 4.9 | 4.9 | 4.9 | 4.9 | 4.9 |
| Polymerization initiator | Ominirad 819 | | 4 | 4 | 4 | 4 | 4 | 4 |
| | TPO-L | | 6 | 6 | 6 | 6 | 6 | 6 |
| | Speedcure 7010 | | — | — | — | — | — | — |
| Polymerization inhibitor | BYK307 | | — | — | 1 | 1 | — | — |
| | TEGORAD 2100 | | — | — | — | — | 0.3 | 5 |
| Siloxane compund | N-nitrose-N-phenyl hydroxylamine aluminum salt | | 0.1 | 0.1 | 0.1 | 0.1 | 0.1 | 0.1 |
| | MEHQ | | 1 | 1 | 1 | 1 | 1 | 1 |
| SP value of polymerizable monomer [MPa$^{1/2}$] | | | 17.7 | 17.7 | 17.7 | 17.7 | 17.7 | 17.7 |
| Difference in SP value [MPa$^{1/2}$] | | | 15.1 | 5.0 | 15.1 | 5.0 | 15.1 | 15.1 |

TABLE 3-continued

|  |  |  |  |  |  |  |  |
|---|---|---|---|---|---|---|---|
| Proportion of monomer having Tg of 30° C. or higher [% by mass] |  | 88.6 | 88.6 | 88.5 | 88.5 | 88.6 | 87.9 |
| Evaluation | Readability | A | A | A | A | A | B |
|  | Readability after passage of time | A | A | A | A | A | B |
|  | Readability after transfer test | C | C | C | C | B | A |
|  | Readability after adhesion test | B | B | B | B | A | A |
|  | Readability after rub test | C | C | B | B | C | B |

|  |  | Molecular weight | Example 13 | Example 14 | Example 15 | Example 16 |
|---|---|---|---|---|---|---|
| Pigment | Compound B-1 |  | 1 | — | 1 | — |
|  | Compound B-37 |  | — | 1 | — | 1 |
| Pigment derivative | Pigment derivative 1 having acidic functional group |  | 0.005 | — | 0.005 | — |
|  | Pigment derivative having basic functional group |  | — | 0.005 | — | 0.005 |
| Dispersant | Block polymer 1 having basic functional group (SP value: 32.73) | 22000 | 1 | — | 1 | — |
|  | Block polymer 1 having acidic functional group (SP value: 22.68) | 3500 | — | 1 | — | 1 |
| Polymerizable monomer | MPDDA |  | 22.995 | 22.995 | 22.995 | 22.995 |
|  | DPGDA |  | 25 | 25 | 25 | 25 |
|  | IBOA |  | 12 | 12 | 10 | 10 |
|  | TCDDMDA |  | 16 | 16 | 14 | 14 |
|  | TMPTA |  | 5 | 5 | 5 | 5 |
|  | EOTMPTA |  | — | — | 2 | 2 |
|  | PEA |  | 4.9 | 4.9 | 4.9 | 4.9 |
| Polymerization initiator | Ominirad 819 |  | 4 | 4 | 4 | 4 |
|  | TPO-L |  | 6 | 6 | 6 | 6 |
|  | Speedcure 7010 |  | — | — | 2 | 2 |
| Polymerization inhibitor | BYK307 |  | — | — | — | — |
| Siloxane compund | TEGORAD 2100 |  | 1 | 1 | 1 | 1 |
|  | N-nitrose-N-phenyl hydroxylamine aluminum salt |  | 0.1 | 0.1 | 0.1 | 0.1 |
|  | MEHQ |  | 1 | 1 | 1 | 1 |
| SP value of polymerizable monomer [MPa$^{1/2}$] |  |  | 17.7 | 17.7 | 17.7 | 17.7 |
| Difference in SP value [MPa$^{1/2}$] |  |  | 15.1 | 5.0 | 15.1 | 5.0 |
| Proportion of monomer having Tg of 30° C. or higher [% by mass] |  |  | 88.5 | 88.5 | 88.2 | 88.2 |
| Evaluation | Readability |  | A | A | A | A |
|  | Readability after passage of time |  | A | A | A | A |
|  | Readability after transfer test |  | B | B | A | A |
|  | Readability after adhesion test |  | A | A | A | A |
|  | Readability after rub test |  | B | B | B | B |

TABLE 4

|  |  | Molecular weight | Example 17 | Example 18 | Example 19 | Example 20 | Example 21 |
|---|---|---|---|---|---|---|---|
| Pigment | Compound B-1 |  | 1 | — | 1 | — | — |
|  | Compound B-3 |  | — | — | — | — | — |
|  | Compound B-7 |  | — | — | — | 1 | — |
|  | Compound B-41 |  | — | — | — | — | — |
|  | Compound B-43 |  | — | — | — | — | 1 |
|  | Compound B-44 |  | — | — | — | — | — |
|  | Compound B-37 |  | — | 1 | — | — | — |
| Pigment derivative | Pigment derivative 1 having acidic functional group |  | 0.005 | — | — | — | 0.005 |
|  | Pigment derivative 2 having acidic functional group |  | — | — | 0.005 | 0.005 | — |
|  | Pigment derivative having basic functional group |  | — | 0.005 | — | — | — |
| Dispersant | Block polymer 1 having basic functional group (SP value: 32.73) | 22000 | 1 | — | 1 | 1 | 1 |
|  | Block polymer 1 having acidic functional group (SP value: 22.68) | 3500 | — | 1 | — | — | — |

TABLE 4-continued

| | | | | | | |
|---|---|---|---|---|---|---|
| Polymerizable monomer | MPDDA | 22.995 | 22.995 | 22.995 | 22.995 | 22.995 |
| | DPGDA | 25 | 25 | 25 | 25 | 25 |
| | IBOA | 14 | 14 | 14 | 14 | 14 |
| | TCDDMDA | 14 | 14 | 14 | 14 | 14 |
| | TMPTA | 5 | 5 | 5 | 5 | 5 |
| | EOTMPTA | 2 | 2 | 2 | 2 | 2 |
| | PEA | 0.9 | 0.9 | 0.9 | 0.9 | 0.9 |
| Polymerization initiator | Ominirad 819 | 4 | 4 | 4 | 4 | 4 |
| | TPO-L | 6 | 6 | 6 | 6 | 6 |
| | Speedcure 7010 | 2 | 2 | 2 | 2 | 2 |
| Siloxane compound | TEGORAD 2100 | 1 | 1 | 1 | 1 | 1 |
| Polymerization inhibitor | N-nitrose-N-phenyl hydroxylamine aluminum salt | 0.1 | 0.1 | 0.1 | 0.1 | 0.1 |
| | MEHQ | 1 | 1 | 1 | 1 | 1 |
| SP value of polymerizable monomer [MPa$^{1/2}$] | | 17.6 | 17.6 | 17.6 | 17.6 | 17.6 |
| Difference in SP value [MPa$^{1/2}$] | | 15.2 | 5.1 | 15.2 | 15.2 | 15.2 |
| Proportion of monomer having Tg of 30° C. or higher [% by mass] | | 93.0 | 93.0 | 93.0 | 93.0 | 93.0 |
| Evaluation | Readability | A | A | A | A | A |
| | Readability after passage of time | A | A | A | A | A |
| | Readability after transfer test | A | A | A | A | A |
| | Readability after adhesion test | A | A | A | A | A |
| | Readability after rub test | A | A | A | A | A |

| | | Molecular weight | Example 22 | Example 23 | Example 24 | Example 25 |
|---|---|---|---|---|---|---|
| Pigment | Compound B-1 | | — | — | — | 1 |
| | Compound B-3 | | — | — | 1 | — |
| | Compound B-7 | | — | — | — | — |
| | Compound B-41 | | 1 | — | — | — |
| | Compound B-43 | | — | — | — | — |
| | Compound B-44 | | — | 1 | — | — |
| | Compound B-37 | | — | — | — | — |
| Pigment derivative | Pigment derivative 1 having acidic functional group | | — | 0.005 | 0.005 | — |
| | Pigment derivative 2 having acidic functional group | | 0.005 | — | — | — |
| | Pigment derivative having basic functional group | | — | — | — | — |
| Dispersant | Block polymer 1 having basic functional group (SP value: 32.73) | 22000 | 1 | 1 | 1 | 1 |
| | Block polymer 1 having acidic functional group (SP value: 22.68) | 3500 | — | — | — | — |
| Polymerizable monomer | MPDDA | | 22.995 | 22.995 | 22.995 | — |
| | DPGDA | | 25 | 25 | 25 | — |
| | IBOA | | 14 | 14 | 14 | 76 |
| | TCDDMDA | | 14 | 14 | 14 | — |
| | TMPTA | | 5 | 5 | 5 | 10 |
| | EOTMPTA | | 2 | 2 | 2 | — |
| | PEA | | 0.9 | 0.9 | 0.9 | 0.9 |
| Polymerization initiator | Ominirad 819 | | 4 | 4 | 4 | 4 |
| | TPO-L | | 6 | 6 | 6 | 6 |
| | Speedcure 7010 | | 2 | 2 | 2 | — |
| Siloxane compound | TEGORAD 2100 | | 1 | 1 | 1 | — |
| Polymerization inhibitor | N-nitrose-N-phenyl hydroxylamine aluminum salt | | 0.1 | 0.1 | 0.1 | 0.1 |
| | MEHQ | | 1 | 1 | 1 | 1 |
| SP value of polymerizable monomer [MPa$^{1/2}$] | | | 17.6 | 17.6 | 17.6 | 17.1 |
| Difference in SP value [MPa$^{1/2}$] | | | 15.2 | 15.2 | 15.2 | 15.6 |
| Proportion of monomer having Tg of 30° C. or higher [% by mass] | | | 93.0 | 93.0 | 93.0 | 87.5 |
| Evaluation | Readability | | A | A | A | B |
| | Readability after passage of time | | A | A | A | B |
| | Readability after transfer test | | A | A | A | C |
| | Readability after adhesion test | | A | A | A | B |
| | Readability after rub test | | A | A | A | C |

TABLE 5

| | | Molecular weight | Comparative Example 1 | Comparative Example 2 | Comparative Example 3 | Comparative Example 4 | Comparative Example 5 | Comparative Example 6 |
|---|---|---|---|---|---|---|---|---|
| Pigment | Compound B-1 | | — | 1 | 1 | 1 | 1 | 1 |
| | Compound P-1 | | 1 | — | — | — | — | — |
| Pigment derivative | Pigment derivative 1 having acidic functional group | | 0.005 | 0.005 | 0.005 | 0.005 | 0.005 | 0.005 |
| Dispersant | Graft polymer 1 having basic functional group (SP value: 18.62) | 59000 | — | 1 | — | — | — | — |
| | Graft polymer 2 having basic functional group (SP value: 20.10) | 24000 | — | — | 1 | — | — | — |
| | Graft polymer 3 having basic functional group (SP value: 21.74) | 52890 | — | — | — | 1 | — | — |
| | Block polymer 1 having basic functional group (SP value: 32.73) | 22000 | 1 | — | — | — | — | 1 |
| | Block polymer 2 having basic functional group (SP value: 33.55) | 12000 | — | — | — | — | 1 | — |
| Polymerizable monomer | MPDDA | | 22.995 | 22.995 | 22.995 | 22.995 | 11.995 | 22.995 |
| | DPGDA | | 25 | 25 | 25 | 25 | 10 | 3 |
| | IBOA | | 14 | 14 | 14 | 4 | 60 | — |
| | TCDDMDA | | 14 | 14 | 14 | 14 | — | — |
| | TMPTA | | 5 | 5 | 5 | 5 | 5 | 5 |
| | ACMO | | — | — | — | 10 | — | — |
| | EOTMPTA | | 2 | 2 | 2 | 2 | 1 | 2 |
| | PEA | | 0.9 | 0.9 | 0.9 | 0.9 | 0.9 | 0.9 |
| Solvent | 1-Methoxybutyl acetate | | — | — | — | — | — | 50 |
| Polymerization initiator | Ominirad 819 | | 4 | 4 | 4 | 4 | 2 | 4 |
| | TPO-L | | 6 | 6 | 6 | 6 | 4 | 6 |
| | Speedcure 7010 | | 2 | 2 | 2 | 2 | 1 | 2 |
| Siloxane compound | TEGORAD 2100 | | 1 | 1 | 1 | 1 | 1 | 1 |
| Polymerization inhibitor | N-nitrose-N-phenyl hydroxylamine aluminum salt | | 0.1 | 0.1 | 0.1 | 0.1 | 0.1 | 0.1 |
| | MEHQ | | 1 | 1 | 1 | 1 | 1 | 1 |
| SP value of polymerizable monomer [MPa$^{1/2}$] | | | 17.6 | 17.6 | 17.6 | 18.1 | 17.2 | 17.6 |
| Difference in SP value [MPa$^{1/2}$] | | | 15.2 | 1.1 | 2.5 | 3.6 | 16.3 | 15.1 |
| Proportion of monomer having Tg of 30° C. or higher [% by mass] | | | 93.0 | 93.0 | 93.0 | 93.0 | 93.4 | 82.6 |
| Evaluation | Readability | | D | C | C | C | C | D |
| | Readability after passage of time | | D | D | D | D | D | D |
| | Readability after transfer test | | B | B | B | B | B | — |
| | Readability after adhesion test | | B | B | B | B | B | — |
| | Readability after rub test | | B | B | B | B | B | — |

As shown in Tables 2 to 5, it has been found that in Examples 1 to 25, because the ink contains a near-infrared absorbing colorant represented by Formula 1, polymerizable monomers, a polymerization initiator, and a dispersant, the content of the polymerizable monomers is 50% by mass or more with respect to the total amount of the ink jet recording ink, and the difference between the SP value of the polymerizable monomers and the SP value of the dispersant is 3.8 MPa$^{1/2}$ to 16.0 MPa$^{1/2}$, an article with a recorded image having excellent readability and having excellent readability after the passage of time is obtained.

It has been found that in Comparative Example 1, because the ink does not contain a near-infrared absorbing colorant represented by Formula 1, the readability and the readability after the passage of time deteriorate.

It has been found that In Comparative Examples 2 to 4, because the difference between the SP value of the polymerizable monomers and the SP value of the dispersant is less than 3.8 MPa$^{1/2}$, the readability after the passage of time deteriorates.

It has been found that In Comparative Example 5, because the difference between the SP value of the polymerizable monomers and the SP value of the dispersant is more than 16.0 MPa$^{1/2}$, the readability and the readability after the passage of time deteriorate.

It has been found that in Comparative Example 6, because the content of the polymerizable monomers is less than 50% by mass, the readability and the readability after the passage of time deteriorate.

It has been found that the molecular weight of the dispersant in Example 3 is 50,000 or less, and the readability of Example 3 is better than the readability of Example 1.

It has been found that the dispersant in Example 5 is a block polymer, and the readability after the passage of time is better in Example 5 than in Example 3.

It has been found that Example 7 contains a pigment derivative, and the readability after the passage of time is better in Example 7 than in Example 5.

It has been found that Example 9 contains a siloxane compound, and the readability after a rub test is better in Example 9 than in Example 7.

It has been found that Examples 11 to 13 contain a siloxane compound having a polymerizable group, and the readability after a transfer test and the readability after an adhesion test are better in Examples 11 to 13 than in Example 9.

Particularly, it has been found that the content of the siloxane compound having a polymerizable group is 0.5% by mass to 3% by mass with respect to the total amount of the ink in Example 13, and the evaluation results of Example 13 are better overall than the evaluation results of Examples 11 and 12.

It has been found that Example 15 contains an acylphosphine oxide compound and a thioxanthone compound, and the readability after a transfer test is better in Example 15 than in Example 13.

It has been found that the proportion of a polymerizable monomer having a glass transition temperature of 30° C. or higher is 90% by mass or more in polymerizable monomers in Example 17, and the readability after a rub test is better in Example 17 than in Example 15.

Example 26

The same ink as Example 24 was introduced into a sixth throttle of a single-pass ink jet printer ("Jet Press 540WV" manufactured by FUJIFILM Corporation).

A polyethylene terephthalate (PET) film was prepared as a substrate. The ink was jetted from the ink jet head in the ink jet printer, and an image having a halftone dot rate of 3% was formed on the substrate by a single-pass method.

The application of the ink was performed by a single-pass method under the conditions of 600 dpi×600 dpi and a substrate transportation speed of 50 m/min.

Then, as exposure for full curing, the ink applied onto the substrate was irradiated with the active energy ray A within 0.1 seconds after the ink was landed. The active energy ray A is an ultraviolet ray having a peak wavelength of 385 nm. The exposure amount of the active energy ray A was 6,600 mJ/cm². For the obtained article with a recorded image, the readability, the readability after the passage of time, the readability after a transfer test, the readability after an adhesion test, and the readability after a rub test were evaluated by the above evaluation methods. All the evaluation results were A.

Example 27

The ink was applied onto the substrate in the same manner as in Example 26.

Then, the ink applied onto the substrate was irradiated with the first active energy ray as exposure for semi-curing and irradiated with the second active energy ray as exposure for full curing, in this order. The time taken for the ink to be irradiated with the first active energy ray after being landed was 0.1 seconds, and the time taken for the ink to be irradiated with the second active energy ray after being landed was 2.0 seconds. Both the first active energy ray and second active energy ray are ultraviolet rays having a peak wavelength of 385 nm. The exposure amount of the first active energy ray was 350 mJ/cm², and the exposure amount of the second active energy ray was 6,600 mJ/cm². For the obtained article with a recorded image, the readability, the readability after the passage of time, the readability after a transfer test, the readability after an adhesion test, and the readability after a rub test were evaluated by the above evaluation methods. All the evaluation results were A.

The entire disclosure of Japanese Patent Application No. 2020-153118, filed Sep. 11, 2020, is incorporated into the present specification by reference. In addition, all documents, patent applications, and technical standards described in the present specification are incorporated into the present specification by reference, as if each of the documents, the patent applications, and the technical standards is specifically and individually described.

What is claimed is:

1. An ink jet recording ink comprising:
a near-infrared absorbing colorant represented by Formula 2;
a polymerizable monomer, wherein the polymerizable monomer is a compound having an ethylenically unsaturated group and a molecular weight of less than 1,000;
a polymerization initiator; and
a dispersant, having a basic functional group or an acidic functional group,
wherein a content of the polymerizable monomer is 50% by mass or more with respect to a total amount of the ink jet recording ink, and
a difference between an SP value of the polymerizable monomer and an SP value of the dispersant is 3.8 MPa$^{1/2}$ to 16.0 MPa$^{1/2}$,

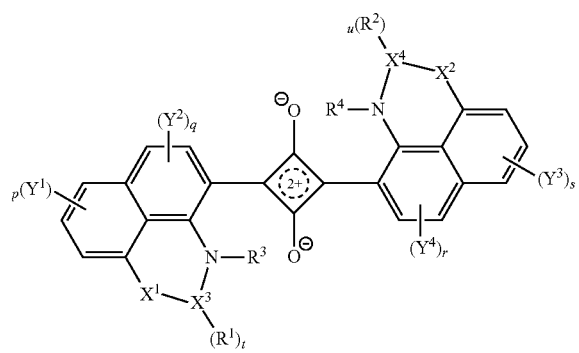

(2)

in Formula 2, $R^1$ and $R^2$ each independently represent an aryl group,
$R^3$ and $R^4$ each independently represent a hydrogen atom or an alkyl group,
$X^1$ and $X^2$ each independently represent an oxygen atom or —N($R^5$)—,
$R^5$ represents a hydrogen atom, an alkyl group, an aryl group, or a heteroaryl group,
$X^3$ and $X^4$ each independently represent a carbon atom or a boron atom,
t and u each represent 1 in a case where $X^3$ and $X^4$ represent a boron atom, and each represent 2 in a case where $X^3$ and $X^4$ represent a carbon atom,
p, q, r and s are 0, and $Y^1$, $Y^2$, $Y^3$, and $Y^4$ are absent.

2. The ink jet recording ink according to claim 1, wherein the dispersant has a weight-average molecular weight of 50,000 or less.

3. The ink jet recording ink according to claim 1, wherein the dispersant is a block polymer.

4. The ink jet recording ink according to claim 1, further comprising:
a pigment derivative.

5. The ink jet recording ink according to claim 1, further comprising:
a siloxane compound.

6. The ink jet recording ink according to claim 5, wherein the siloxane compound includes a siloxane compound having a polymerizable group.

7. The ink jet recording ink according to claim 6,
wherein a content of the siloxane compound having a polymerizable group is 0.5% by mass to 3% by mass with respect to the total amount of the ink jet recording ink.

8. The ink jet recording ink according to claim 1,
wherein the polymerization initiator comprises an acylphosphine oxide compound and a thioxanthone compound.

9. The ink jet recording ink according to claim 1,
wherein 90% by mass or more of the polymerizable monomer is a polymerizable monomer having a glass transition temperature of 30° C. or higher.

10. An ink jet recording method using the ink jet recording ink according to claim 1, the ink jet recording method comprising:
applying the ink jet recording ink onto a substrate in an ink jet recordingmanner; and
irradiating, with an active energy ray the ink jet recording ink applied onto the substrate.

* * * * *